US009820309B2

(12) United States Patent
Masini et al.

(10) Patent No.: US 9,820,309 B2
(45) Date of Patent: Nov. 14, 2017

(54) RELAY NODE, A DONOR RADIO BASE STATION AND METHODS THEREIN

(75) Inventors: Gino Luca Masini, Stockholm (SE); Fredrik Gunnarsson, Linköping (SE); Gunnar Mildh, Sollentuna (SE); Elena Voltolina, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1372 days.

(21) Appl. No.: 13/132,576

(22) PCT Filed: Apr. 14, 2011

(86) PCT No.: PCT/SE2011/050457

§ 371 (c)(1), (2), (4) Date: Jun. 2, 2011

(87) PCT Pub. No.: WO2011/159221

PCT Pub. Date: Dec. 22, 2011

(65) Prior Publication Data

US 2012/0263096 A1 Oct. 18, 2012

Related U.S. Application Data

(63) Continuation of application No. PCT/SE2010/050687, filed on Jun. 18, 2010.

(Continued)

(51) Int. Cl.

*H04W 92/00* (2009.01)
*H04W 76/02* (2009.01)

(Continued)

(52) U.S. Cl.

CPC .............. *H04W 76/02* (2013.01); *H04B 7/14* (2013.01); *H04B 7/155* (2013.01); *H04B 7/2606* (2013.01);

(Continued)

(58) Field of Classification Search

CPC ..... H04W 88/04; H04W 48/16; H04W 92/20; H04W 84/047; H04W 48/20;

(Continued)

(56) References Cited

U.S. PATENT DOCUMENTS 7,447,777 B1 11/2008 Singh Ahuja et al.
7,643,486 B2 1/2010 Belz et al.

(Continued)

FOREIGN PATENT DOCUMENTS

CN 1288628 A 3/2001
CN 101730032 A 6/2010

(Continued)

OTHER PUBLICATIONS

3rd Generation Partnership Project. "Problems of UE Handover in the Relaying Network." 3GPP TSG RAN WG3 #68, R3-101412, Montreal, Canada, May 10-14, 2010.

(Continued)

*Primary Examiner* — Jung-Jen Liu
(74) *Attorney, Agent, or Firm* — Coats & Bennett, PLLC

(57) ABSTRACT

Embodiments herein relate to a method in a relay node (10) for acquiring information about a type of a radio network connection between a donor radio base station (12) and a radio base station (14). The relay node (10) and the donor radio base station (12) are comprised in a radio communications network and the donor radio base station (12) is serving the relay node (10). The relay node (10) receives a message from the donor radio base station (12), which message is indicating a type of radio network application protocol, which type is related to a type of the radio network connection between the donor radio base station (12) and the radio base station (14). The relay node (10) determines the type of the radio network connection based on the type of radio network application protocol indicated in the message.

(Continued)

The relay node (10) also stores the type of radio network connection in relation to the radio base station (14) for selecting the type of radio network connection when later communicating with the radio base station (14).

16 Claims, 18 Drawing Sheets

Related U.S. Application Data

(60) Provisional application No. 61/373,328, filed on Aug. 13, 2010.

(51) Int. Cl.

| | |
|---|---|
| ***H04W 36/10*** | (2009.01) |
| ***H04W 40/36*** | (2009.01) |
| ***H04B 7/155*** | (2006.01) |
| ***H04B 7/26*** | (2006.01) |
| ***H04W 48/18*** | (2009.01) |
| ***H04B 7/14*** | (2006.01) |
| ***H04W 36/00*** | (2009.01) |
| *H04W 48/20* | (2009.01) |
| *H04W 84/04* | (2009.01) |
| *H04W 88/04* | (2009.01) |
| *H04W 48/16* | (2009.01) |
| *H04W 92/20* | (2009.01) |

(52) U.S. Cl.
CPC ....... *H04W 36/0016* (2013.01); *H04W 36/10* (2013.01); *H04W 40/36* (2013.01); *H04W 48/18* (2013.01); *H04W 48/16* (2013.01); *H04W 48/20* (2013.01); *H04W 84/045* (2013.01); *H04W 84/047* (2013.01); *H04W 88/04* (2013.01); *H04W 92/20* (2013.01)

(58) Field of Classification Search
CPC . H04W 7/2606; H04W 36/10; H04W 84/045; H04W 48/18; H04W 40/36; H04W 36/0016; H04W 76/02; H04B 7/155; H04B 7/14
USPC ........ 370/203, 204–215, 229–240, 310–337, 370/338–350, 351–394, 395.1, 395.3, 370/395.4, 395.41, 395.42, 395.5, 395.52, 370/431–457, 458–463, 464–497, 370/498–522, 523–520, 521–529
See application file for complete search history.

(56) References Cited

U.S. PATENT DOCUMENTS

| | | | | |
|---|---|---|---|---|
| 2006/0155875 | A1 | 7/2006 | Cheriton | |
| 2006/0274742 | A1 | 12/2006 | Pong | |
| 2010/0322146 | A1* | 12/2010 | Liu et al. | 370/315 |
| 2011/0019670 | A1 | 1/2011 | Mattes et al. | |
| 2011/0080890 | A1* | 4/2011 | Cai et al. | 370/331 |
| 2011/0164542 | A1* | 7/2011 | Cai et al. | 370/312 |
| 2011/0188408 | A1* | 8/2011 | Yi et al. | 370/254 |
| 2011/0280127 | A1 | 11/2011 | Raaf et al. | |
| 2012/0039299 | A1* | 2/2012 | Teyeb et al. | 370/331 |
| 2013/0039185 | A1 | 2/2013 | Teyeb et al. | |
| 2013/0143574 | A1 | 6/2013 | Teyeb et al. | |

FOREIGN PATENT DOCUMENTS

| | | | |
|---|---|---|---|
| EP | 1058989 | B1 | 12/2004 |
| WO | 2011159211 | A1 | 12/2011 |

OTHER PUBLICATIONS

3rd Generation Partnership Project. "3rd Generation Partnership Project; Technical Specification Group Radio Access Network; Evolved Universal Terrestrial Radio Access (E-UTRA); Relay Architectures for E-UTRA (LTE-Advanced) (Release 9)." 3GPP Standard, 3GPP TR 36.806, V9.0.0, Mar. 2010, Sophia-Antipolis Cedex, France.

3rd Generation Partnership Project. "DeNB Proxying of Inbound Non-UE Associated X2 Messages." 3GPP TSG-RAN WG3 #69bis, R3-102878, Xi'An, China, Oct. 11-15, 2010.

3rd Generation Partnership Project. "X2 Connections Setup to Other Nodes." 3GPP TSG-RAN WG3 AdHoc, R3-101890, Beijing, China, Jun. 29-Jul. 1, 2010.

3RD Generation Partnership Project. "Stage-2 Description of Relaying into 36.300." 3GPP Change Request, 3GPP TSG-RAN WG2 Meeting #69bis, R2-102659, Beijing, China, Apr. 12-16, 2010.

3rd Generation Partnership Project. "Relay Requirements & Use Case Study in LTE-Advanced." 3GPP TSG-RAN3 #64, R3-091228, San Francisco, USA, May 4-8, 2009.

3rd Generation Partnership Project. "Response to R3-101412." 3GPP TSG-RAN WG3 Meeting #68, R3-101667, Montreal, Canada, May 10-14, 2010.

* cited by examiner

RELAY NODE, A DONOR RADIO BASE STATION AND METHODS THEREIN

TECHNICAL FIELD

The present invention relates to a relay node, a donor radio base station and methods therein. Furthermore, embodiments herein relate to acquire information or inform about a type of a radio network connection between the donor radio base station and a radio base station.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

One important aspect with radio communications networks also referred to as wireless networks is to ensure that the radio communications network is simple to deploy and cost efficient to operate. The vision is that the radio communications network shall be self-organizing in as many aspects as possible. Furthermore, good coverage is important when aiming at a mobile broadband experience, both outdoors and indoors. Typically, this coverage is provided via radio base stations covering larger cells, also referred to as macro base stations, with dedicated transport connections, but it is also possible to consider self-backhauling radio base stations also referred to as Relay Nodes (RN) where the same technology is used both for user data between a user equipment and the RN and for the transport connection between the RN and a radio base station with a dedicated transport connection. Self-backhauled here means that the RN is acting as a relay node to the donor radio base station.

The architecture of the 3G Long Term Evolution (LTE) system may thus include Relay Nodes (RN) also called relay base stations. Furthermore, the LTE architecture discloses logical interfaces between radio base stations (eNBs) called X2 interfaces, and between radio base station and Mobility Management Entity (MME) or Serving Gateway (S-GW), called S1 or S11 interfaces. The radio base station serving the RN acts as an X2 and S1 proxy, terminating and forwarding the X2 communication between the RN and another radio base station, and the S1 communication between the RN and the MME. The radio base station serving the RN may be referred to as a donor radio base station (DeNB).

RNs that are self-backhauling are further considered for LTE Advanced. LTE-Advanced extends LTE Release 8 with support for relaying as a tool to improve e.g. the radio coverage of high data rates, group mobility, temporary network deployment, the cell-edge throughput and/or to provide radio coverage in new areas.

RNs are wirelessly connected to a respective donor cell of a donor radio base station (donor eNB) via a radio interface denoted a Un interface, and user equipments are connected to respective RN via a radio interface denoted a Uu interface. The donor radio base station further connects the respective RN to the core network, e.g. the Evolved Packet Core (EPC) in LTE. The Uu interface is the radio interface between the user equipment and the RN. The Un interface is the radio interface between the RN and the donor radio base station.

The Un interface connection may be a "Type 1" connection, which means that the connection is an in-band connection, in which case the eNB-to-RN connections or links share the same frequency band with direct eNB-to-UE connections or links within the donor cell. The Un interface connection may furthermore be a "Type 2" connection, which means that the connection is an out-band connection, in which case the eNB-to-RN connection does not operate in the same band as direct eNB-to-UE connections within the donor cell.

At least "Type 1" RNs are supported by LTE-Advanced. A "Type 1" RN is an in-band RN that controls cells, each of which appears to a user equipment as a separate cell distinct from the donor cell. The cells have their own Physical Cell ID (PCI), which is a fingerprint used by a user equipment to identify the cell, and transmit their own synchronization channels and reference symbols. In the context of single-cell operation, the user equipment receives scheduling information and data transmission feedback directly from the in-band RN and sends its control information to the in-band RN. The in-band RN appears as a radio base station to a legacy user equipment, i.e. the in-band RN is backwards compatible. The in-band RN may be nomadic meaning that it may change donor eNBs over time, via disruptive events such as physical relocations or the relay node associated with the disconnection of the radio interface. The in-band RN may further be inactive at times for example to save energy.

To a large extent, the RNs may be perceived as any radio base station in the radio communications network. For example, the connections X2 and S1 between RN and other radio base stations are established, partly over Un. But also, the RN is handled to a large extent as any user equipment served by the serving radio base station. For example, when the RN is installed, it attaches to the radio communications network via the UE attach procedure, which is a procedure used to attach a user equipment to the network, and first when Radio Resource Control (RRC) connectivity is established, the serving radio base station is informed by the core network that the user equipment is in fact a RN.

From the perspective of the RN it is not possible to disclose whether a certain type of radio network connection is established between the donor radio base station and a neighboring radio base station. Since the RN may need to select between different types of radio network connections e.g. X2 connectivity and S1 connectivity, when for example performing handover, the performance of the radio communications network will be reduced if the wrong type of radio network connection is selected.

SUMMARY

An object of some embodiments herein is to provide a mechanism to improve the performance in a radio communications network.

According to an aspect of embodiments herein the object is achieved by a method in a relay node for acquiring information about a type of a radio network connection between a donor radio base station and a radio base station. The relay node and donor radio base station are comprised in a radio communications network. The donor radio base station is serving the relay node. The relay node receives a message from the donor radio base station, which message is indicating a type of radio network application protocol. The type of radio network application protocol is related to a type of a radio network connection between the donor radio base station and the radio base station. The relay node determines the type of the radio network connection based on the type of radio network application protocol indicated in the message. The relay node further stores the type of radio network connection in relation to the radio base station. This stored information may be used for selecting the type of radio network connection when later communicating with the radio base station.

In order to perform the method a relay node for acquiring information about the type of the radio network connection between the donor radio base station and the radio base station. The relay node is arranged to be comprised in a radio communications network and is arranged to be served by the donor radio base station. The relay node comprises a receiver configured to receive a message from the donor radio base station. The message is indicating a type of radio network application protocol, which type of radio network application protocol is related to a type of a radio network connection between the donor radio base station and the radio base station. The relay node further comprises a determining circuit configured to determine the type of the radio network connection based on the type of radio network application protocol indicated in the message. Additionally, the relay node comprises a memory circuit configured to store the type of radio network connection in relation to the radio base station to be used when selecting the type of radio network connection when later communicating with the radio base station.

According to an aspect of embodiments herein the object is achieved by a method in a donor radio base station for informing a relay node about a type of a radio network connection between the donor radio base station and a radio base station. The relay node and the donor radio base station are comprised in a radio communications network. The donor radio base station serves the relay node. The donor radio base station receives a protocol message of a first type of a radio network application protocol, from the relay node or from the radio base station. The donor radio base station furthermore transmits a message to the relay node, which message is indicating the first type or a second type of a radio network application protocol. Each type of a radio network application protocol is related to a type of the radio network connection and thereby the relay node is informed of the type of the radio network connection.

Embodiments herein describe means to enable the relay node to know whether a certain type of the radio network connection, such as X2 connection, is established between its serving donor radio base station and other radio base stations, or not in an efficient manner. Thereby the signaling procedure is facilitated and the performance is improved as the stored information in the relay node is used to communicate, e.g. during a handover procedure.

BRIEF DESCRIPTION OF THE DRAWINGS

Embodiments will now be described in more detail in relation to the enclosed drawings, in which.

DETAILED DESCRIPTION

Figure 1:
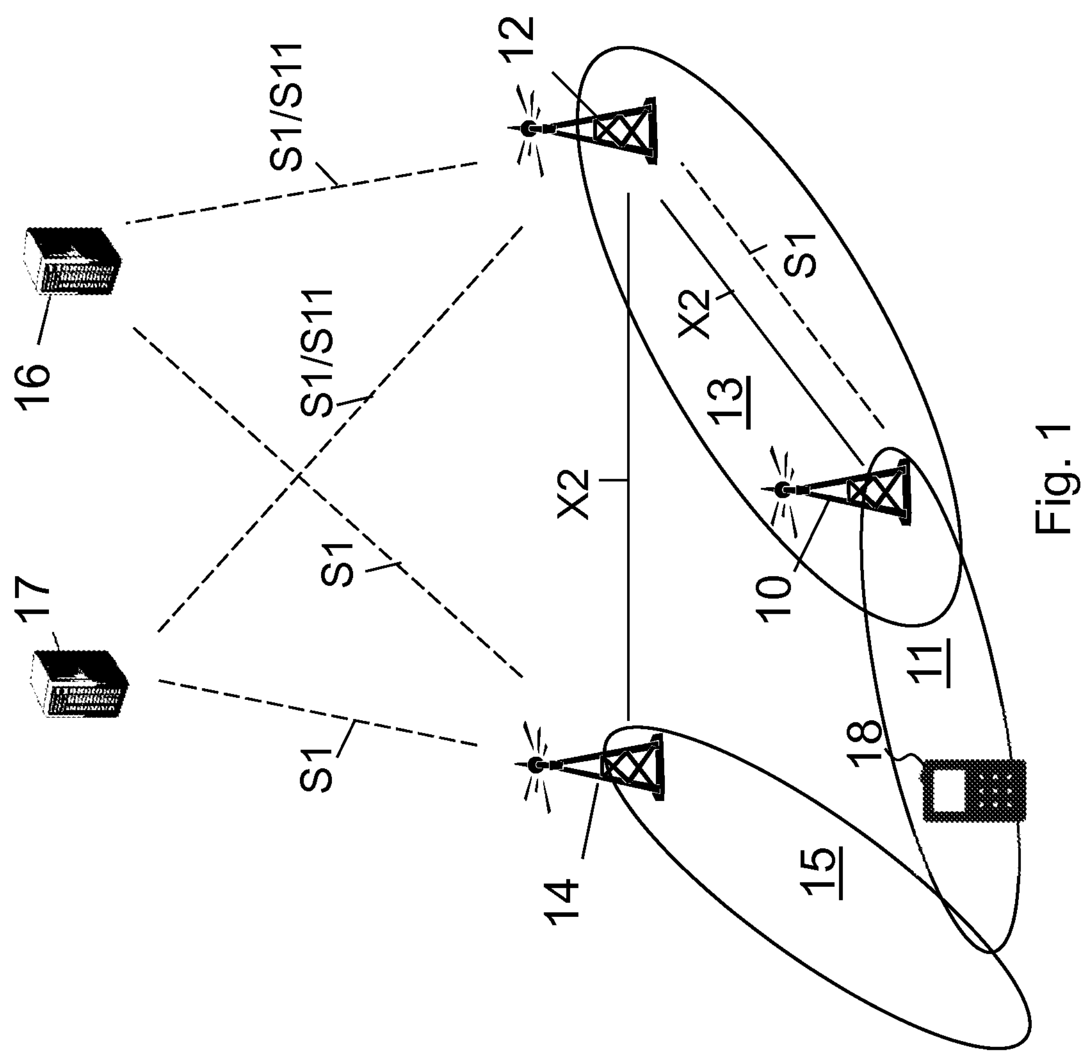
FIG. 1 is a schematic overview of a radio communications network.

FIG. 1 is a schematic overview of a radio communications network. Embodiments herein are discussed based on an Evolved Universal Terrestrial Radio Access (E-UTRA) system, which is also commonly referred to as the Long-Term Evolution (LTE) of the widely deployed WCDMA systems but may be implemented in any radio communications network that uses inter radio access network interfaces and intra radio access network interfaces between radio network entities. Inter radio access network interfaces may also be referred to as peer to peer interfaces and intra radio access network interfaces may also be referred to as interfaces terminated in a core network of the radio communications network. However, the figures will relate to the LTE and especially the LTE Advance network architecture. In the example of LTE, X2 is the peer to peer interface between radio base stations with signalling defined by the X2 Application Protocol, and S1 or S11 is the interface terminated in the core network between a radio base station and a core network with signalling defined by the S1 Application Protocol. The radio communication network may use a radio technology, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

In order to improve coverage of the radio communications network a relay node 10 is provided covering, for example, a radio coverage hole or similar in the radio communications network. The relay node 10 provides radio coverage over a geographical area forming a relay cell 11. Thereby, the relay node 10 provides improved radio coverage within the radio communications network. The radio communications network further comprises a first radio base station 12 and a second radio base station 14 each providing radio coverage over at least one respective geographical area forming a respective cell, a first cell 13 and a second cell 15. The relay node 10 is served by the first radio base station 12, which is referred to as the donor radio base station 12.

The donor radio base station 12 may be connected to the second radio base station 14 over a type of radio network connection e.g. over a peer to peer connection such as an X2 connection. The donor radio base station 12 may be a member of a Mobility Management Entity (MME) pool comprising a first MME 16. The second radio base station 14 may be a member of a Mobility Management Entity (MME) pool comprising a second MME 17. Thus, the donor radio base station 12 is controlled by the first MME 16 and the second radio base station 14 is controlled by the second MME 17. The donor radio base station 12 may additionally or alternatively be connected to the second radio base station 14 through an interface terminated in the core network over a type of radio network connection, such as a S1 or S11 connection, via the first MME 16 or the second MME 17. User equipments (UE) are served in cells by respective radio base station 12,14 and are communicating with respective radio base station 12,14. The user equipments transmit data over a radio interface to the radio base stations in uplink (UL) transmissions and the radio base stations transmit data to the user equipments in downlink (DL) transmissions. A user equipment 18 has poor channel conditions to the radio base station 12 at a certain geographic location but is served by the relay node 10.

It should be understood by the skilled in the art that "user equipment" is a non-limiting term which means any wireless terminal, device or node e.g. personal digital assistant (PDA), laptop, mobile, sensor, relay, or even a small base station communicating within respective cell.

The respective radio base station 12,14 may also be referred to as e.g. a NodeB, an evolved Node B (eNB, eNode B), a base transceiver station, Access Point Base Station, base station router, or any other network unit capable to communicate with a user equipment within the cells 13,15 served by the respective radio base station 12,14 depending e.g. of the radio access technology and terminology used.

Embodiments herein concentrate on a situation where the relay node 10 is unaware of the connectivity between the donor radio base station 12 and the second radio base station 14, also referred to as the radio base station 14.

Especially, embodiments herein disclose ways for the relay node 10 to acquire information about the type of connectivity, also referred to as type of radio network connection. The relay node 10 receives a message from the donor radio base station 12, which message indicates a type of radio network application protocol. The type of radio network application protocol is related to the type of the radio network connection. The relay node 10 then determines the type of the radio network connection between the donor radio base station 12 and the second radio base station 14 based on the type of radio network application protocol indicated in the message. The relay node 10 stores the type of radio network connection in relation to the second radio base station 14 within the relay node 10. The relay node 10 may then select the type of radio network connection when later communicating with the second radio base station 14. For example, when the relay node 10 later performs a handover process of the user equipment 18 to the second radio base station 14 the relay node 10 uses the acquired information and sends a handover request of an application protocol related to the stored type of radio network connection.

According to some embodiments herein the donor radio base station 12 may inform the relay node 10 about type of radio network connection e.g. X2 support to the second radio base station 14 in a new explicit message or a new Information Element (IE) in an existing message. This may require that a new message and Information Element (IE) are defined only for this specific case.

According to some embodiments, the donor radio base station 12 may implicitly inform the relay node 10 of the type of the radio network connection to the second radio base station 14. For example, the relay node 10 detects a presence of the second radio base station 14 and sends an address recovery message to the donor radio base station 12. The donor radio base station 12 may know that an X2 connection is already set up to the second radio base station 14 and compiles an X2 setup request message to the relay node 10 on behalf of the second radio base station 14. The donor radio base station 12 may alternatively setup an X2 connection to the second radio base station 14. The relay node 10 then receives the X2 setup request message and based on the type of the message, being an X2 message, the relay node 10 determines that an X2 connection is present to the second radio base station 14.

According to some embodiments the relay node 10 may be informed by receiving an X2 handover request from the second radio base station 14 and based on that determine that an X2 connection is setup between the donor radio base station 12 and the second radio base station 14.

According to some embodiments the relay node 10 may be informed by sending an X2 handover request to the second radio base station 14 and receiving either an X2 handover acknowledgement or a S1AP handover command via the donor radio base station 12 from the second radio base station 14. The relay node 10 may alternatively send a S1AP Handover Required to the donor radio base station 12 and based on the type of the application protocol in the response received, store the type of radio network connection in relation to the second radio base station 14 for future knowledge.

Thus, in some embodiments the knowledge of X2 connectivity is acquired by the relay node 10 from the donor radio base station 12 when the relay node 10 tries to use X2 or S1 as the signaling means to the second radio base station 14. From the type of the application protocol of the response received the relay node 10 may determine if X2 is established. In this way the signaling is facilitated and requires no new IEs or messages.

Figure 2:
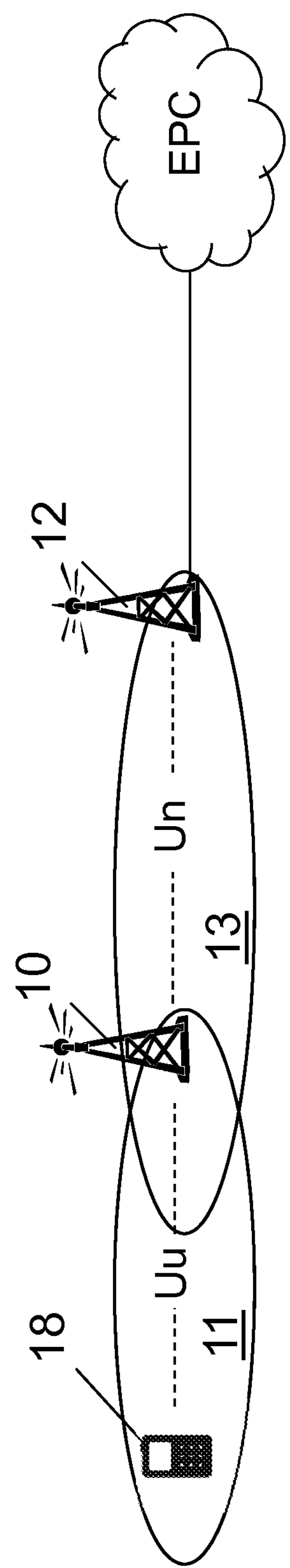
FIG. 2 is a schematic overview of a radio communications network.

FIG. 2 is a block diagram depicting interfaces in the radio communications network. The relay node 10 is wirelessly connected to the donor cell 13 of the donor radio base station 12 via a Un interface, and the user equipment 18 is connected to the relay cell 11 of the relay node 10 via a Uu interface. The donor radio base station 12 further connects the relay node 10 to the core network, e.g. the evolved packet core (EPC). The Uu interface is the radio interface between the user equipment 18 and the relay node 10. The Un interface is the radio interface between the relay node 10 and the donor radio base station 12.

The Un interface connection may be an in-band connection. In-band connection means that 'radio base station-to-relay node' connection share the same frequency band with a direct 'radio base station-to-UE' connection within the donor cell 13. The Un interface connection may alternatively be an out-band connection. Out-band connection means that the 'radio base station-to-relay node' connection does not operate in the same frequency band as the direct 'radio base station-to-UE' connection.

As stated above, the relay node 10 may be perceived as any radio base station. For example, the connections X2 and S1 between the relay node 10 and other radio base stations may be established, partly over Un. But also, the relay node 10 may be handled to a large extent as any user equipment served by the serving donor radio base station 12. For example, when the relay node 10 is installed, it attaches to the network via a UE attach procedure. First when Radio Resource Control (RRC) connectivity is established, the donor radio base station 12 is informed by the core network that the 'user equipment' is in fact the Relay Node (RN) 10.

As mentioned above, the relay node 10 acquires information whether the radio network connection type between the donor radio base station 12 and the second radio base station 14 is a peer to peer interface, also called X2 interface, or an interface terminated in the core network, also referred to as a S1 interface. The type of the radio network connection is then stored in relation to the second radio base station 14 at the relay node 10 for being used when selecting the type when later communicating with the radio base station 14. This is performed according to some embodiments described below.

Figure 3:
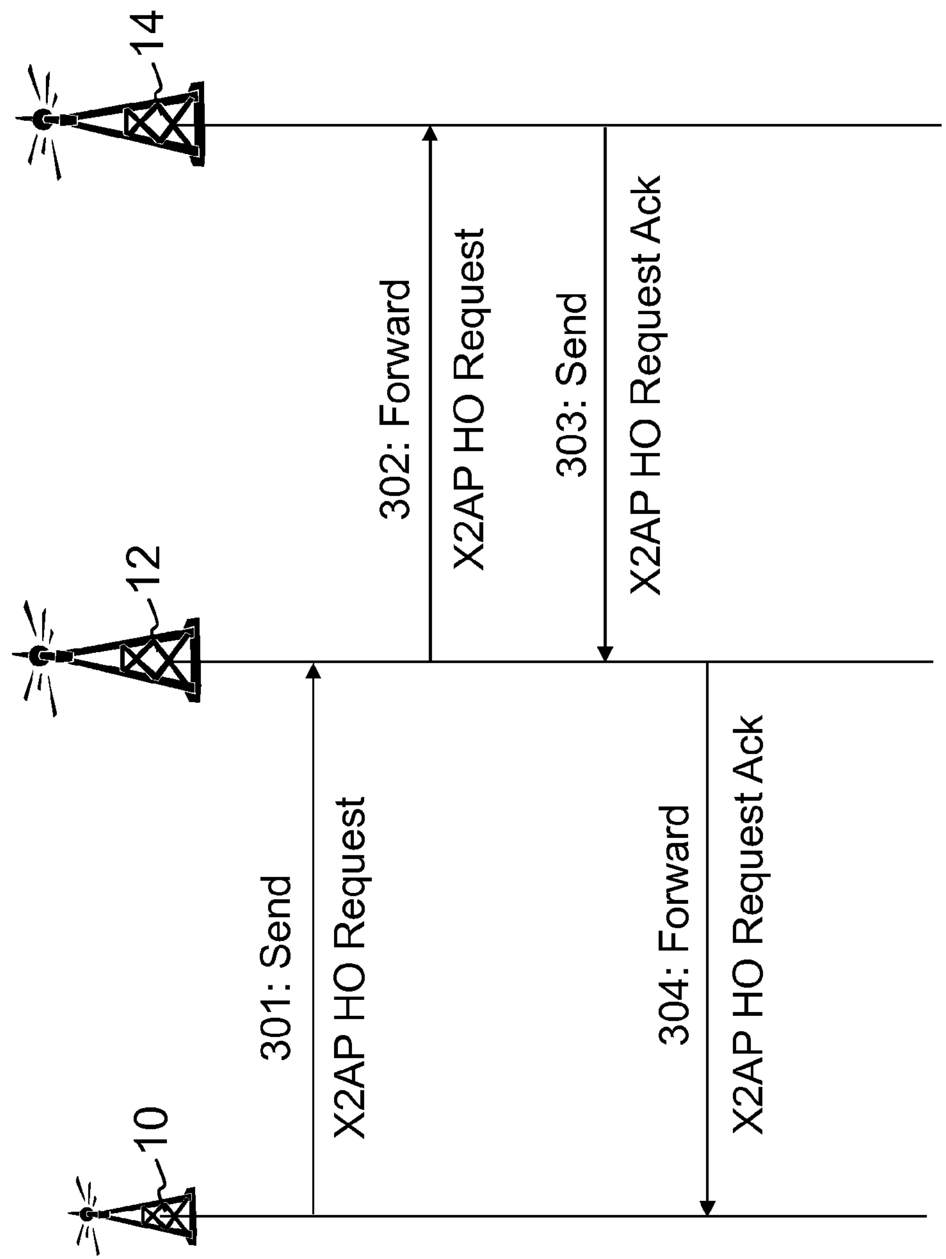
FIG. 3 is a schematic signalling scheme in a radio communications network.

FIG. 3 is a schematic signaling scheme of some embodiments of a method in the radio communications network, exemplified as an LTE network. In this example, the relay node 10 may be informed of type of radio network connection between the donor radio station 12 and the second radio base station 14 by sending a handover request of a certain type to the second radio base station 14. In some embodiments, the relay node 10 attempts to use X2 handover preparation signaling to the second radio base station 14 assuming that X2 interface is established between donor radio base station 12 and the second radio base station 14. X2 handover preparation may be used since an X2 handover procedure is more efficient than the S1 handover procedure.

Step 301. The relay node 10 sends an X2 Application Protocol (AP) Handover (HO) Request to the donor radio base station 12 of e.g. the user equipment 18 served in the relay cell 11. This is an example of step 1501 in FIG. 15.

Step 302. If X2 is established, then the handover process proceeds and the donor radio base station 12 forwards the X2AP Handover Request to the second radio base station 14.

Step 303. The second radio base station 14 accepts the handover of the user equipment 18 and sends an X2AP Handover Request Acknowledgement (ACK) to the donor radio base station 12.

Step 304. The donor radio base station 12 then forwards the X2AP Handover Request ACK to the relay node 10. This is an example of step 1705 in FIG. 17. Thus, the relay node 10 receives eventually a response of X2AP, acknowledging the handover preparations, and indicating that X2 is established. This means that the relay node 10 may learn the existence of X2 connectivity, that is, the type of the radio network connection, from the type of the response from the donor radio base station 12, and stores this connectivity information for future or later use.

Figure 4:
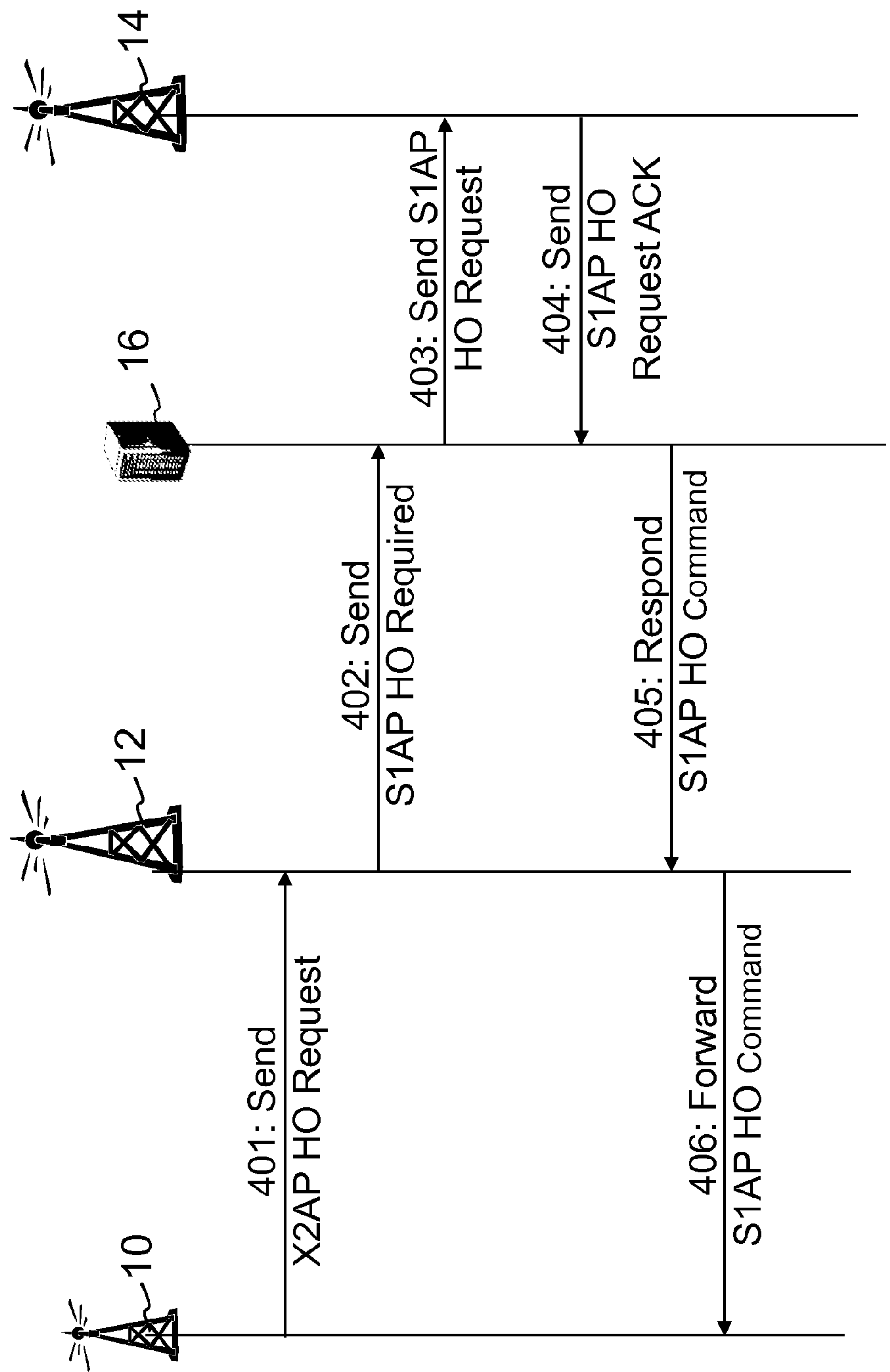
FIG. 4 is a schematic signalling scheme in a radio communications network.

FIG. 4 shows a signaling scheme of some embodiments of a method in the radio communications network. Also in this example, the relay node 10 may be informed of the type of radio network connection between the donor radio base station 12 and the second radio base station 12 by sending a handover request of a certain type to the second radio base station 14. FIG. 4 shows a converted X2 handover preparation into S1 handover signalling. An S1 response message may include information related to the UE context or the original X2 message so that the relay node 10 may link the X2 procedure and the S1 procedure together, i.e. so it knows that the S1 message is a response to the X2 message. The information may comprise a temporal context or transaction ID, or some other information related to the user equipment 18.

Step 401. The relay node 10 sends an X2AP Handover (HO) Request to the donor radio base station 12 of e.g. the user equipment 18 served in the relay cell 11. This is an example of step 1501 in FIG. 15.

Step 402. If X2 is not established, the donor radio base station 12 converts the X2 message to a corresponding S1 message, a so called S1AP Handover Required, which is sent to the first MME 16.

Step 403. The first MME 16 sends an S1AP Handover Request to the second radio base station 14.

Step 404. The second radio base station 14 accepts the handover of the user equipment 18 and sends a S1AP Handover Request ACK to the first MME 16.

Step 405. The first MME 16 may respond with the result of the handover attempt in an S1 message, a so called S1AP Handover Command, to the donor radio base station 12.

Step 406. The donor radio base station 12 forwards the S1AP Handover Command to the relay node 10. This is an example of step 1705 in FIG. 17. Since the response is a type defined as an S1AP type, the relay node 10 learns that X2 connectivity is not available and stores this information for later or future use.

This means that the relay node 10 will gradually over time learn and store the existence of X2 connectivity to neighboring radio base stations.

Figure 5:
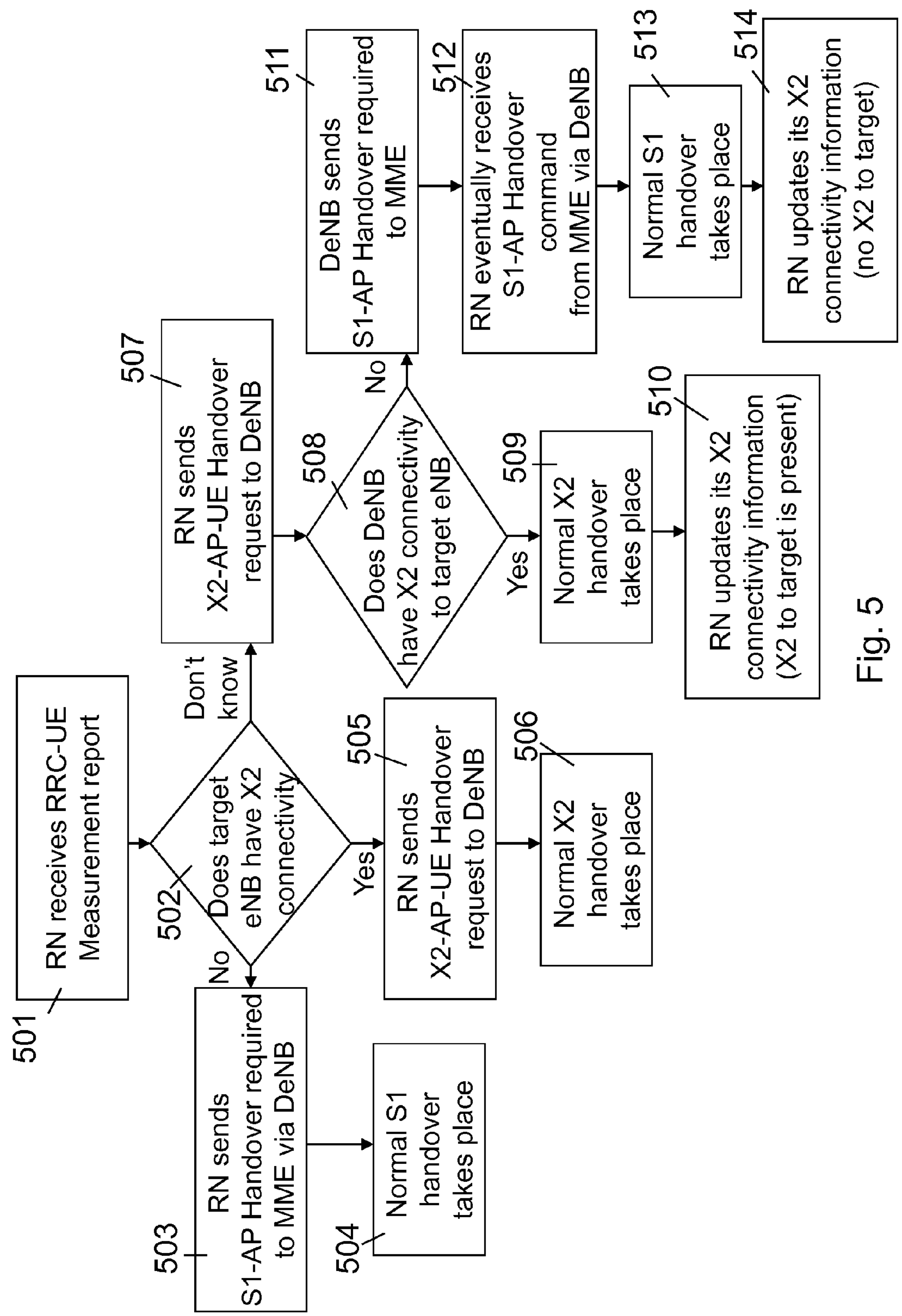
FIG. 5 is a schematic flow chart of a method in a radio communications network disclosing X2 connectivity support learning procedure.

An overview of some embodiments of a total learning procedure using handover messages is illustrated in FIG. 5.

Step 501. The relay node 10 may receive a measurement report of received signal strength from the user equipment 18 indicating a handover to the second cell 15 of the second radio base station 14. The measurement report may be represented by a RRC-UE Measurement report.

Step 502. The relay node 10 may: know that the second radio base station 14 has an X2 connectivity to the donor radio base station 12; know that the second radio base station 14 doesn't have an X2 connectivity to the donor radio base station 12; or don't know the radio network connection type between the second radio base station 14 and the donor radio base station 12.

Step 503. When the relay node 10 knows that the second radio base station 14 doesn't have an X2 connectivity to the donor radio base station 12, the relay node 10 may send a S1AP Handover Required to the second MME 17 via the donor radio base station 12.

Step 504. After step 503, the S1 handover procedure may continue in a normal manner. Thus, normal S1 handover takes places.

Step 505. When the relay node 10 knows that the second radio base station 14 has an X2 connectivity to the donor radio base station 12, the relay node 10 sends an X2AP Handover Request of the user equipment 18 to the donor radio base station 12.

Step 506. After step 505, the X2 handover procedure may continue in a normal manner. Thus, normal X2 handover takes places.

Step 507. When the relay node 10 doesn't know whether that the second radio base station 14 has an X2 connectivity or not to the donor radio base station 12, the relay node 10 may send, according to embodiments herein, an X2AP handover request of the user equipment 18 to the donor radio base station 12. This is an example of step 1501 in FIG. 15.

Step 508. The donor radio base station 12 determines whether an X2 connectivity between the second radio base station 14 and the donor radio base station 12 exists or not based on previous knowledge, stored information, of the type of radio network connection between the second radio base station 14 and the donor radio base station 12.

Step 509. When the donor radio base station 12 has an X2 connectivity to the second radio base station 14, may also referred to as the target radio base station 14, normal X2 handover procedure will take place.

Step 510. After the step 509, the relay node 10 updates its X2 connectivity information by storing that X2 to the second radio base station 14 is present. This is an example of step 1504 in FIG. 15.

Step 511. When the donor radio base station 12 doesn't have an X2 connectivity to the second radio base station 14, the donor radio base station 12 sends a S1AP Handover Required for the user equipment 18 to the first MME 16.

Step 512. The relay node 10 eventually receives an S1AP Handover Command from the first MME 16 via the donor radio base station 12. This is an example of step 1502 in FIG. 15.

Step 513. After step 512, then normal S1 handover takes place.

Step 514. As the type of received application protocol was an S1AP type, the relay node 10 then updates its X2 connectivity information by storing that X2 is not present to the second radio base station 14. The second radio base station may also be referred to as target radio base station. This is an example of step 1504 in FIG. 15.

Thus, the relay node 10 learns and stores the radio network connection type and thereby improves the performance in future or later use.

In some embodiments, the relay node 10 may signal any relevant X2 message to each neighboring radio base station 14 with unknown X2 connectivity. If X2 is established, the relay node 10 will receive the expected X2 response. However, if X2 is not established, then the donor radio base station 12 responds with a failure or reject cause to the relay node 10, indicating that the X2 connectivity is missing. These procedures are exemplified in FIG. 6 and FIG. 7 considering the X2 message being an eNB configuration update message, but other X2 messages may be used in a similar fashion.

Figure 6:
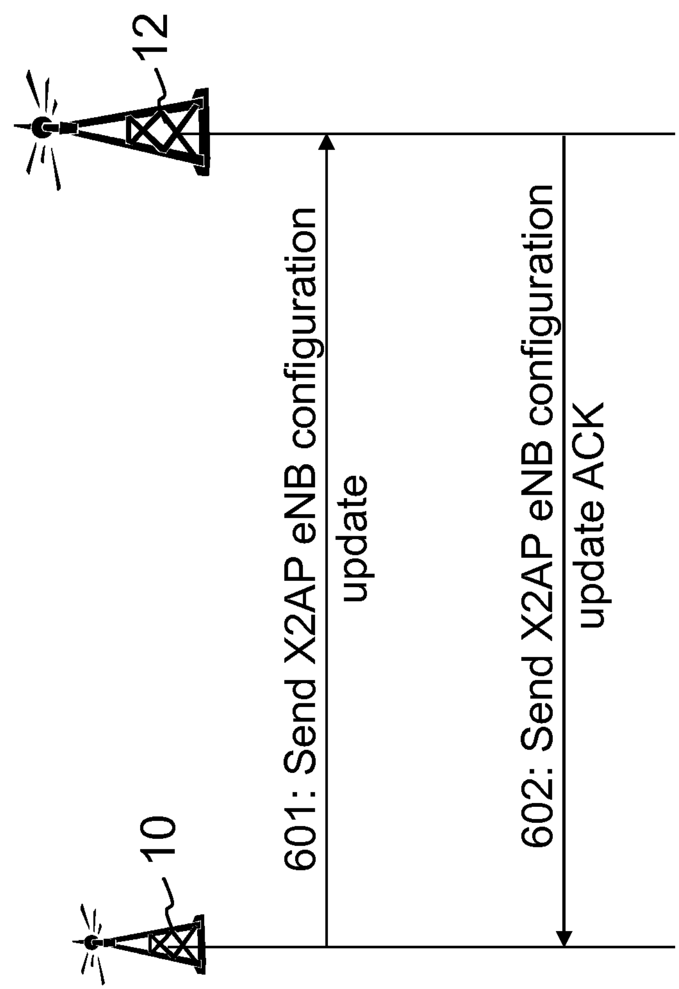
FIG. 6 is a schematic X2 probing signalling scheme in a radio communications network.

FIG. 6 is disclosing an X2 probing method according to some embodiments wherein X2AP is used.

Step 601. The relay node 10 sends an X2AP eNB configuration update message to the donor radio base station 12 targeting the second radio base station 14 for which the X2 connectivity is probed. This is an example of step 1501 in FIG. 15.

Step 602. The second radio base station 14 sends an X2AP eNB configuration update ACK message. This is a case in which X2 is established between donor radio base station 12 and the other, second, radio base station 14. This interface connection to the second radio base station 14 is then stored in the relay node 10.

Figure 7:
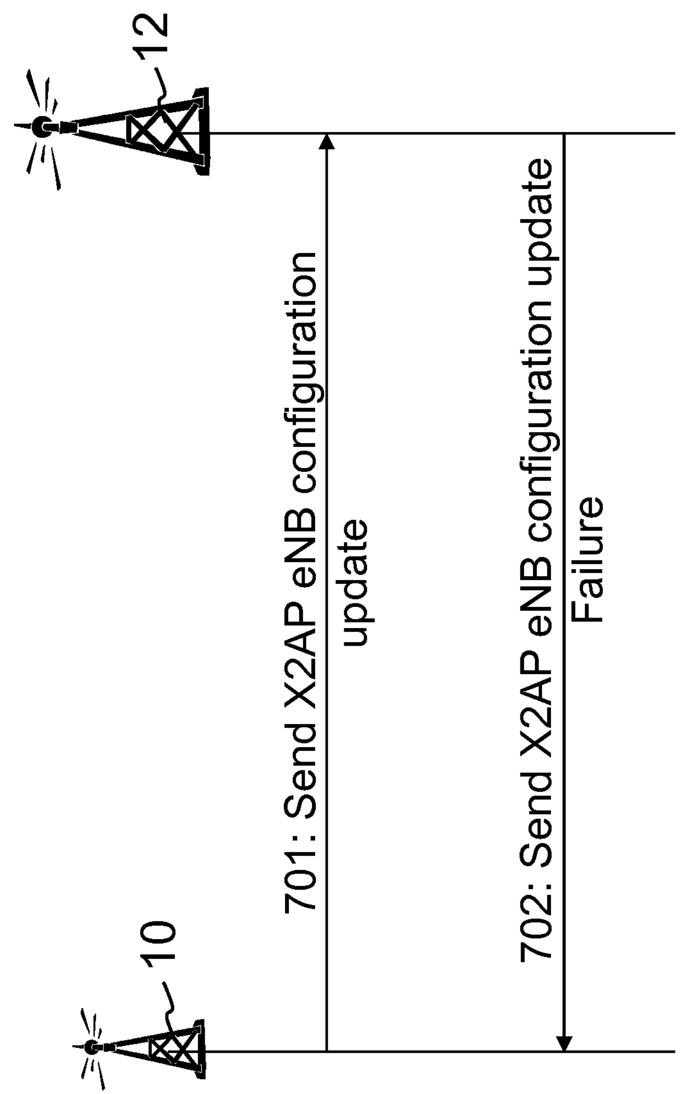
FIG. 7 is a schematic X2 probing signalling scheme in a radio communications network.

FIG. 7 is disclosing an X2 probing method according to some embodiments wherein X2AP is used.

Step 701. The relay node 10 sends or transmits an eNB configuration update message to the donor radio base station 12 targeting the second radio base station 14 for which the X2 connectivity is probed. This is an example of step 1501 in FIG. 15.

Step 702. The donor radio base station 12 sends an eNB configuration update failure message to the relay node 10. This is the case in which X2 is not established between donor radio base station 12 and the second radio base station 14, and the fact that X2 is missing between donor radio base station 12 and the second radio base station 14 may be encoded in a dedicated failure cause, e.g. "X2 connectivity is missing". This radio network connection, determined to be a S1 connection, is then stored in the relay node 10 in relation to the second radio base station 14.

Figure 8:
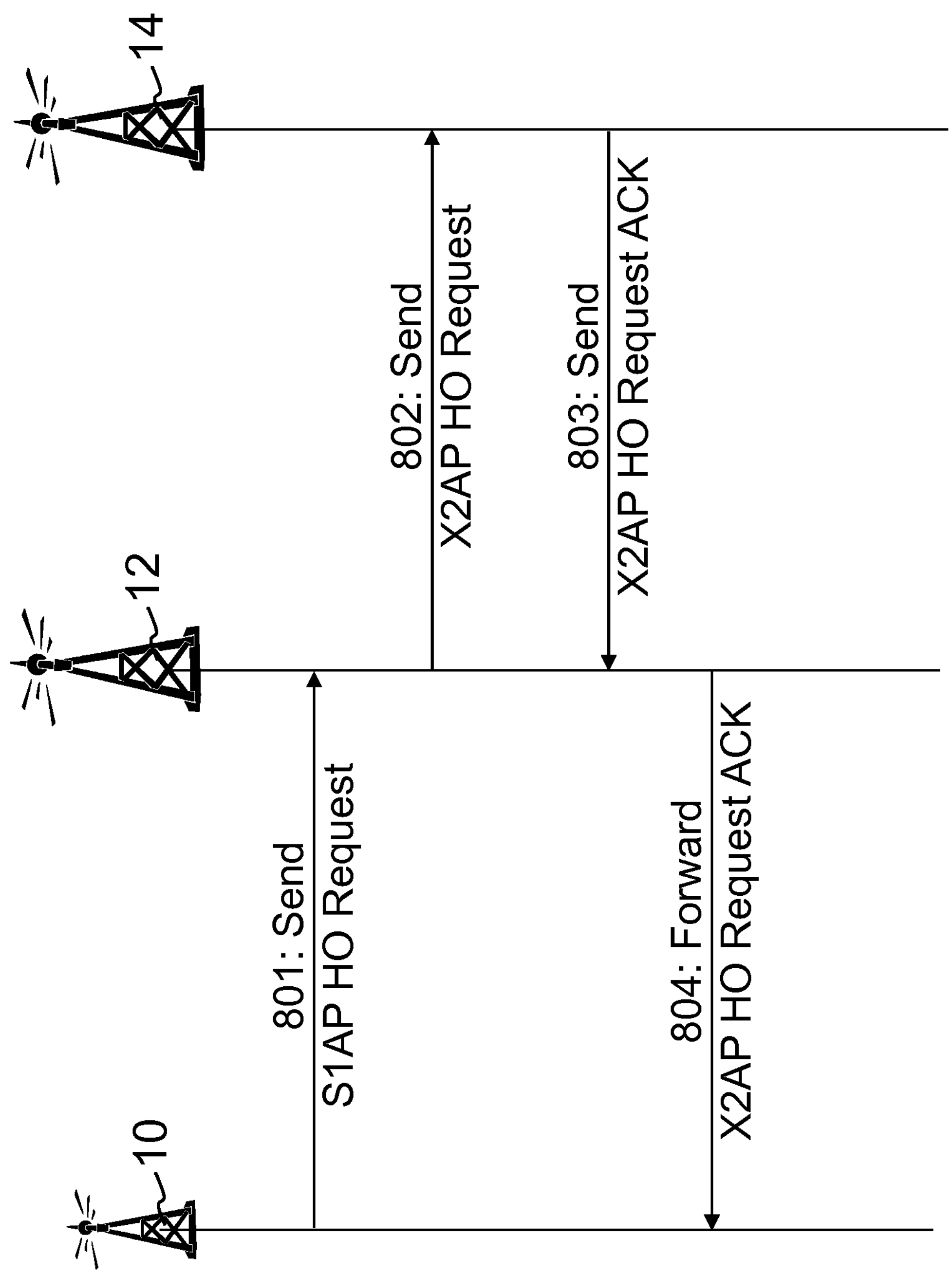
FIG. 8 is a schematic X2 probing signalling scheme in a radio communications network.

FIG. 8 shows a similar but yet alternative embodiments, where the relay node 10 attempts to use S1 for handover signaling and learns about X2 support from the response of the donor radio base station 12. In some embodiments where X2 is established, the donor radio base station 12 may convert the S1 message to a corresponding initial handover X2 message, and the relay node 10 may learn the X2 support from the X2 response from the donor radio base station 12. The X2 response message may include information related to the UE context or the original S1 message so that the relay node 10 may link the S1 procedure and the X2 procedure together, i.e. so it knows that the X2 message is a response to the S1 message. The information may include a temporal context or transaction ID, or some other information related to the user equipment 18.

FIG. 8 shows a S1 handover preparation into X2 handover signaling, in case X2 is established, but where the relay node 10 initiated the handover procedure using S1AP.

Step 801. The relay node 10 sends a S1AP handover required to the donor radio base station 12. This is an example of step 1501 in FIG. 15.

Step 802. The donor radio base station 12 converts the S1 message to an X2 message and sends an X2AP handover request to the second radio base station 14.

Step 803. The second radio base station 14 sends a X2AP handover request ACK to the donor radio base station 12 acknowledging the handover request.

Step 804. The donor radio base station 12 then forwards the X2AP handover request ACK to the relay node 10. This is an example of step 1705 in FIG. 17.

The relay node 10 then stores that X2 is present to the second radio base station 14 based on the received X2 message.

Figure 9:
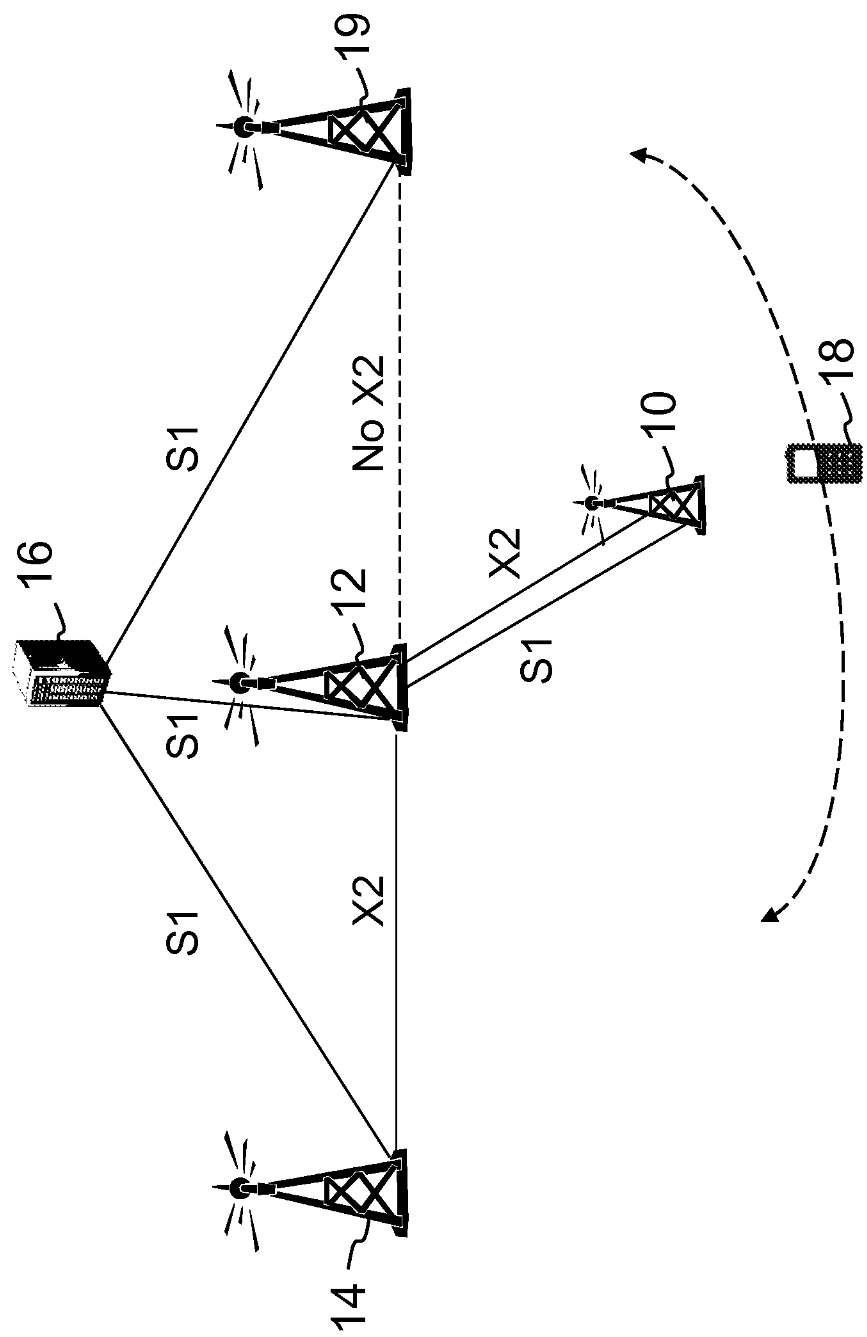
FIG. 9 is a schematic overview of a radio communications network.

FIG. 9 shows a schematic overview of a radio communications network. The radio communications network comprises the user equipment 18 served by the relay node 10. The relay node 10 is connected to the donor radio base station 12 in an X2 connection and an S1 connection. The donor radio base station 12 is connected to the second radio base station 14 with an X2 connection and is also neighboring a third radio base station 19. However, there exists no X2 connection to the third radio base station 19. Each radio base station 12,14,19 is connected to the first MME 16 over a respective S1 connection.

LTE may feature an Automatic Neighbour Relations (ANR) function, where the user equipment 18 may detect and report a unique cell identity such as Physical Cell ID (PCI), E-UTRAN Cell Global Identifier (ECGI), Tracking Area (TA) of discovered cells to its serving radio base station, in the illustrated example the relay node 10. This function is referred to as UE ANR in the sequel. When the donor radio base station 12 is notified by the served user equipment 18 about a discovered neighbouring radio base station, e.g. the second radio base station 14, it may initiate an X2 connection establishment using X2AP and S1AP. The donor radio base station 12 needs the Transport Network Layer (TNL) Internet Protocol (IP) address, TNL address for short, of the discovered neighbouring radio base stations to set up a connection. The TNL address may be recovered using 'Configuration Transfer' messages to the neighbouring radio base stations via the first MME 16 and back. These 'Configuration Transfer' messages may comprise a Self Organising Network (SON) Information Transfer Information Element (IE). The SON Information Transfer IE may comprise the radio base station ID of both radio base stations on the way to the neighbouring radio base station, e.g. the second radio base station 14. The SON Information Transfer IE may additionally or alternatively comprise the TNL address on the way back to the originating donor radio base station 12. With the TNL address of the second radio base station 14, the donor radio base station 12 may establish an X2 connection, and with this connection in place, the donor radio base station 12 and the neighbouring second radio base station 14 may exchange information about radio base station IDs and served cells.

The ANR function for the relay node 10 is facilitated if the relay node 10 broadcast cell identities that include the eNB ID of its serving donor radio base station 12. This means that when neighbouring second radio base station 14 discover the relay node 10, the TNL address recovery procedure will return the TNL address of the donor radio base station 12 of the relay node 10, and X2 will be established between the neighbouring second radio base station 14 and the donor radio base station 12.

According to some embodiments herein four cases are considered:

1 The relay node 10 discovers a neighboring radio base station, e.g. the second radio base station 14 or the third radio base station 19, via UE ANR
   a. X2 is established between neighboring radio base station, the second radio base station 14, and the donor radio base station 12,
   b. X2 is not established between neighboring radio base station, the third radio base station 19, and the donor radio base station 12.

2 The neighboring radio base station 14,19 discovers the relay node 10 via UE ANR
   a. X2 is established between neighboring radio base station, the second radio base station 14, and the donor radio base station 12,
   b. X2 is not established between neighboring radio base station, the third radio base station 19, and the donor radio base station 12.

These cases are illustrated in FIG. 9, where X2 is established between the donor radio base station 12 and the second radio base station 14 but not between the donor radio base station 12 and the third radio base station 19. The relay node 10 has no neighbor relations with cells served by neither the second radio base station 14 nor the third radio base station 19. Furthermore, it is assumed that a radio base station ID of the relay node 10 is the radio base station ID of the donor radio base station 12. Radio base station ID may be referred to as eNB ID. It will be exemplified below how the relay node 10 may acquire the type of the radio network connection to the respective neighboring radio base station 14,19 for the different cases.

Figure 10:
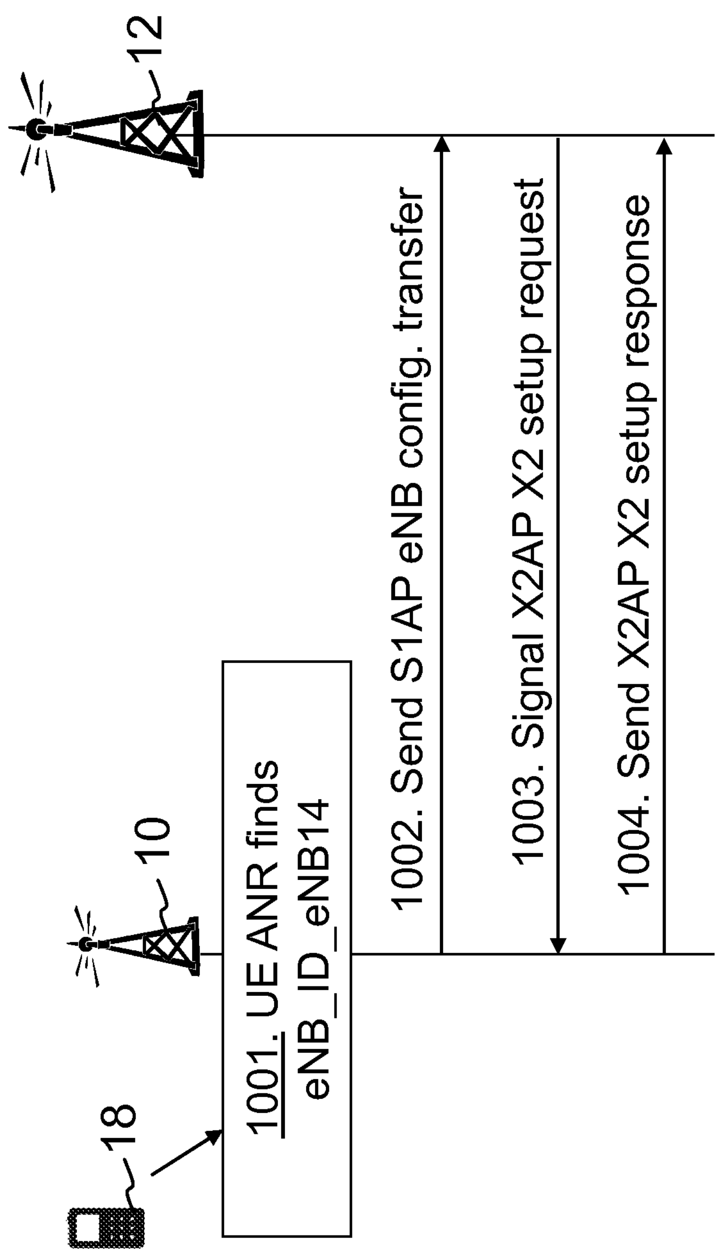
FIG. 10 is a schematic signalling scheme in a radio communications network.

FIG. 10 is a schematic combined flowchart and signaling scheme of case 1a) above wherein X2 is established between the neighboring second radio base station 14 and the donor radio base station 12.

Step 1001. The relay node 10 may discover a cell served by the second radio base station 14 by receiving an eNB ID from the user equipment 18. The UE ANR function of the user equipment 18 finds the eNB ID of the second radio base station 14 (eNB_ID_eNB14) and provides the eNB ID to the relay node 10 that initiates TNL address recovery.

Step 1002. The relay node 10 may then send an S1AP eNB configuration transfer message comprising a SON information transfer IE to the donor radio base station 12. The received eNB ID is used in the SON information transfer IE from the relay node 10, intended to be forwarded to the first MME 16 and further on to the second radio base station 14 to recover its TNL address. This step is an example of step 1501 in FIG. 15.

Step 1003. However, the donor radio base station 12 may conclude that the TNL address recovery procedure may be terminated since X2 is established to the second radio base station 14. Instead the donor radio base station 12 compiles an X2AP X2 Setup Request message on behalf of the second radio base station 14, comprising all details of the second radio base station 14. Seemingly, the X2AP X2 Setup Request message could have originated from the second radio base station 14 itself, and a Global eNB ID is the eNB ID of the second radio base station 14. Note that the X2 connection between the donor radio base station 12 and the relay node 10 is not affected. The donor radio base station 12 then signals an X2AP X2 Setup Request on behalf of the second radio base station 14, indicating the Global eNB ID of the second radio base station 14, and is only a means to exchange information using the existing X2 connection between donor radio base station 12 and the relay node 10.

Alternatively, the donor radio base station 12 may compile an X2AP eNB configuration update message to the relay node 10 on behalf of the second radio base station 14. However, this is less intuitive, since the relay node 10 has to disclose the message origin in terms of the eNB ID from the ECGIs in a Served Cell Information IE. These X2AP eNB configuration update messages may also be compiled if X2 is established at a later stage.

These embodiments may use existing signaling, with the additions of the following two embodiments:

The donor radio base station 12 may terminate an initiated TNL address recovery over S1AP indicating the eNB ID of the second radio base station 14 by the relay node 10 if X2 is available between the donor radio base station 12 and the second radio base station 14. The donor radio base station 12 may alternatively or additionally store information about a TNL address recovery to the second radio base station 14 initiated by the relay node 10. Furthermore, the donor radio base station 12 may compile an X2AP X2 setup request or X2AP eNB configuration update to the relay node 10 on behalf of the second radio base station 14, including all details about the second radio base station 14, if X2 is, or when it becomes, available between the donor radio base station 12 and the second radio base station 14.

The relay node 10 discloses X2 availability between donor radio base station 12 and the second radio base station 14 upon reception of an X2 message sent by the donor radio base station 12 on behalf of the second radio base station 14.

In some embodiments, donor radio base station 12 may compile a SON Information Transfer IE in a MME configuration transfer message to the relay node 10, including the TNL address of the second radio base station 14. This step is an example of step 1705 in FIG. 17.

Step 1004. The relay node 10 responds to the received X2 setup by sending a X2AP X2 setup response to the donor radio base station 12.

The relay node 10 thus acquires the type of the radio connection, in the example an X2 connection is setup, between the donor radio base station 12 and the second radio base station 14, based on the type of application protocol received. The relay node 10 stores this information to select X2 based communication when later communicating with the second radio base station 14.

Thus, in some embodiments the knowledge of X2 connectivity is acquired by the relay node 10 from the donor radio base station 12 by X2 messages sent on behalf of the second radio base station 14. This means that X2 messages are compiled by the donor radio base station 12 but includes information from the second radio base station 14 such that the X2 message seems to originate from the second radio base station 14.

Figure 11:
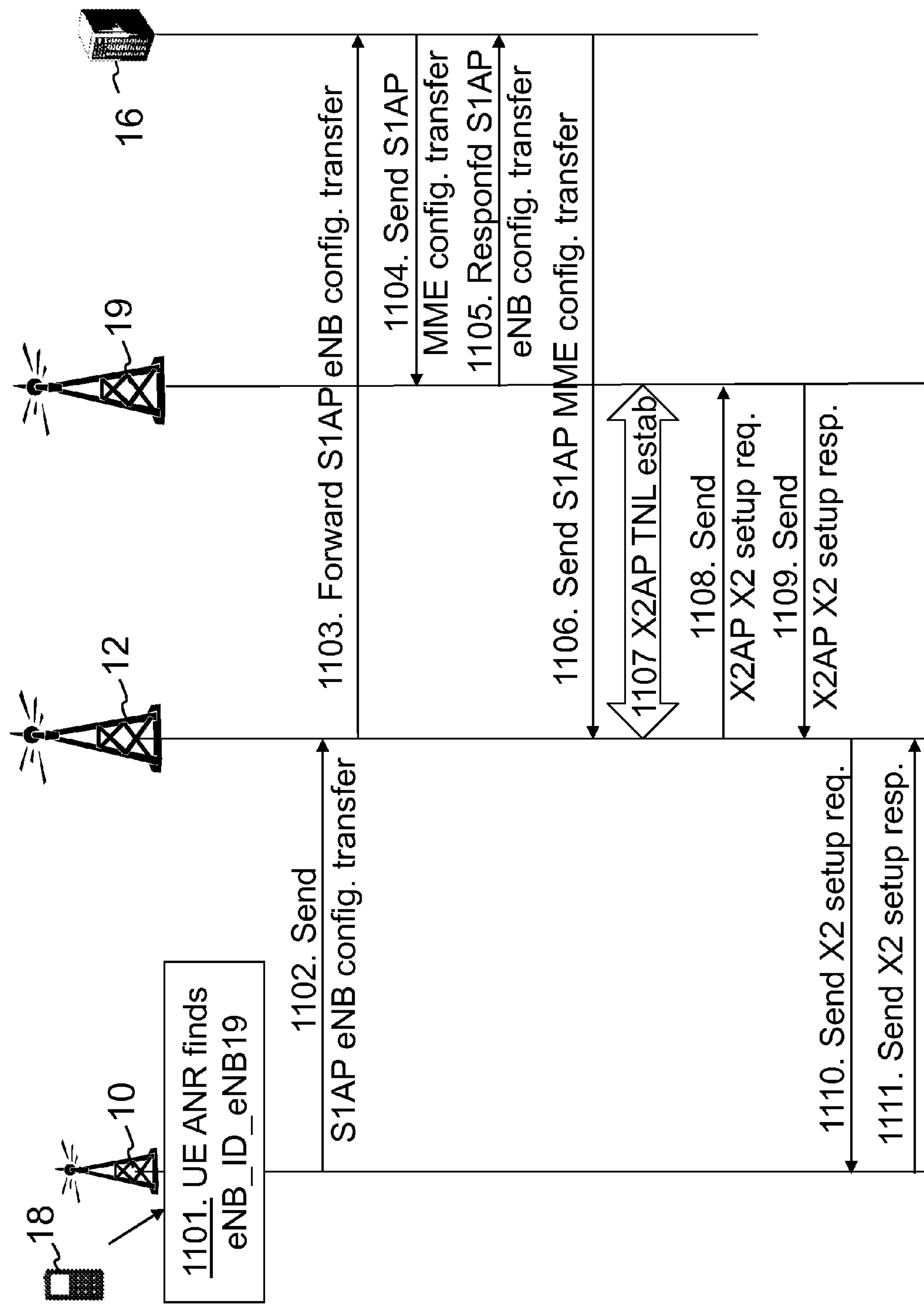
FIG. 11 is a schematic signalling scheme in a radio communications network.

FIG. 11 is a schematic combined flowchart and signaling scheme of case 1b) above wherein X2 is not established between the third radio base station 19 and the donor radio base station 12.

Step 1101. The UE ANR function may provide the eNB ID of the third radio base station 19 (eNB_ID_eNB19) as mentioned in step 1001 in FIG. 10.

Step 1102. The relay node 10 may then send an S1AP eNB configuration transfer message comprising a SON information transfer IE to the donor radio base station 12. The received eNB ID is used in the SON information transfer IE from the relay node 10 intended to be forwarded to the first MME 16 and further on to the third radio base station 19 to recover its TNL address. This step is an example of step 1501 in FIG. 15.

Step 1103. The donor radio base station 12 may then forward the S1AP eNB configuration transfer message to the first MME 16.

Step 1104. The first MME 16 may then transmit a S1AP MME configuration transfer message to the third radio base station 19 to recover the TNL address of the third radio base station 19. An indicated source radio base station is already the eNB ID of the donor radio base station 12 since it is equal to the eNB ID of the relay node 10.

Step 1105. The third radio base station 19 may respond with its TNL address in an S1AP eNB configuration transfer message to the first MME 16.

Step 1106. The first MME 16 then sends a S1AP MME configuration transfer message to the donor radio base station 12.

Step 1107. The donor radio base station 12 and the third radio base station 19 may then initiate an X2 TNL establishment.

Step 1108. If The X2 TNL establishment is successful, the donor radio base station 12 and the neighboring third radio base station 19 exchange information using X2AP X2 Setup Request/Response. First the donor radio base station 12 sends a X2AP X2 setup request to the third radio base station 19.

Step 1109. Then the third radio base station 19 may respond to the request by sending an X2AP X2 setup response.

Step 1110. In direct communication over X2 between the third radio base station 19 and the donor radio base station 12, the sending radio base station, e.g. the third radio base station 19, encloses its Global eNB ID in the message for identification. In this step, the donor radio base station 12 may compile an X2AP X2 Setup Request message on behalf of the third radio base station 19, which means that the donor radio base station 12 encloses the Global eNB ID of the third base station 19 and sends this to the relay node 10. The message comprises information as if it would have been originating from the third base station 19. The message may further comprise Tracking Area Codes (TAC) and transmission parameters, neighbour information, and Globally Unique (GU) Group ID. Seemingly, the X2AP X2 Setup Request message could have originated from the third radio base station 19 itself. This is used by the relay node 10 to disclose X2 availability to the third radio base station 19.

An alternative is that the donor radio base station 12 forwards the X2AP X2 Setup Response from the third radio base station 19 to the relay node 10 to inform about X2 availability. However, this is less consistent with how these procedures are used between macro radio base stations.

Figure 17:
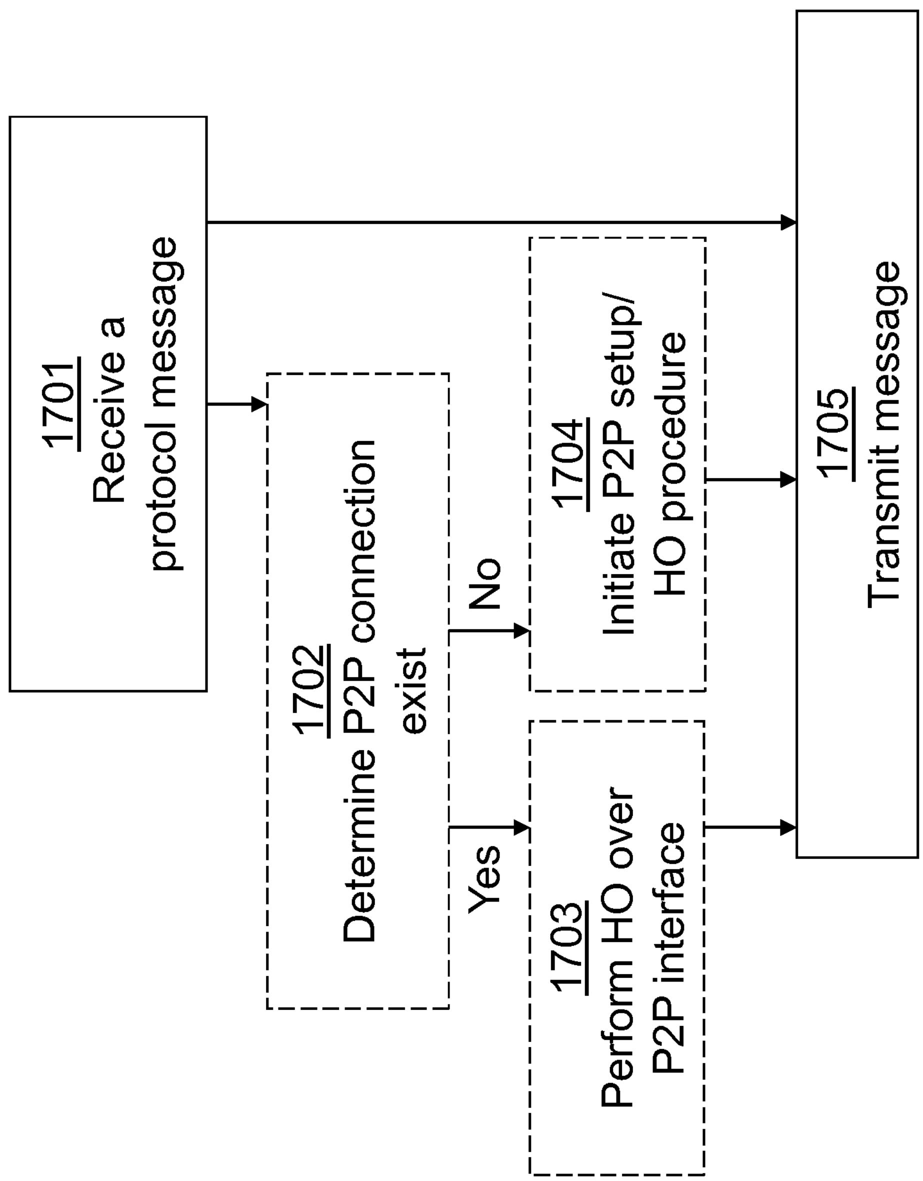
FIG. 17 is a schematic flow chart of a method in a donor radio base station in a radio communications network.

This step is an example of step 1705 in FIG. 17.

Step 1111. The relay node 10 sends an X2AP X2 setup response to the donor radio base station 12. The relay node 10 also stores the information that an X2 is setup between the donor radio base station 12 and the third radio base station 19.

Thus, the relay node 10 uses S1 to signal to the third radio base station 19 while awaiting X2 TNL establishment or if the X2 TNL establishment fails. This alternative may be solved using existing signalling, wherein the donor radio base station 12 stores information about a TNL address recovery to a neighboring radio base station, such as the second or third radio base station, initiated by the relay node 10. The donor radio base station 12 then compiles an X2AP X2 Setup Request or X2AP eNB configuration update message to the relay node 10 on behalf of the neighboring radio base station, including all details about the neighboring radio base station, if X2 is, or when it becomes, available between donor radio base station 12 and neighboring radio base station.

The relay node 10 thus discloses X2 availability between the donor radio base station 12 and the neighboring radio base station upon reception of an X2 message sent by the donor radio base station on behalf of the neighboring radio base station.

In some embodiments, the donor radio base station 12 may forward the MME configuration transfer message to the relay node 10, including the TNL address of the neighboring radio base station. This can be seen by the relay node 10 as another means of confirmation that X2 is established between the donor radio base station 12 and the third radio base station 19. It can also be seen by the relay node 10 as a confirmation that the TNL address recovery was successful. The MME configuration transfer message may be used to transfer information from the third radio base station 19, e.g. Source eNB-ID, X2 TNL configuration info, to the donor radio base station 12 via S1, i.e. traditionally through the first MME 16. The relay node 10 may use this information to learn about information of its cells. This is a way to send neighbor information over S1.

Figure 12:
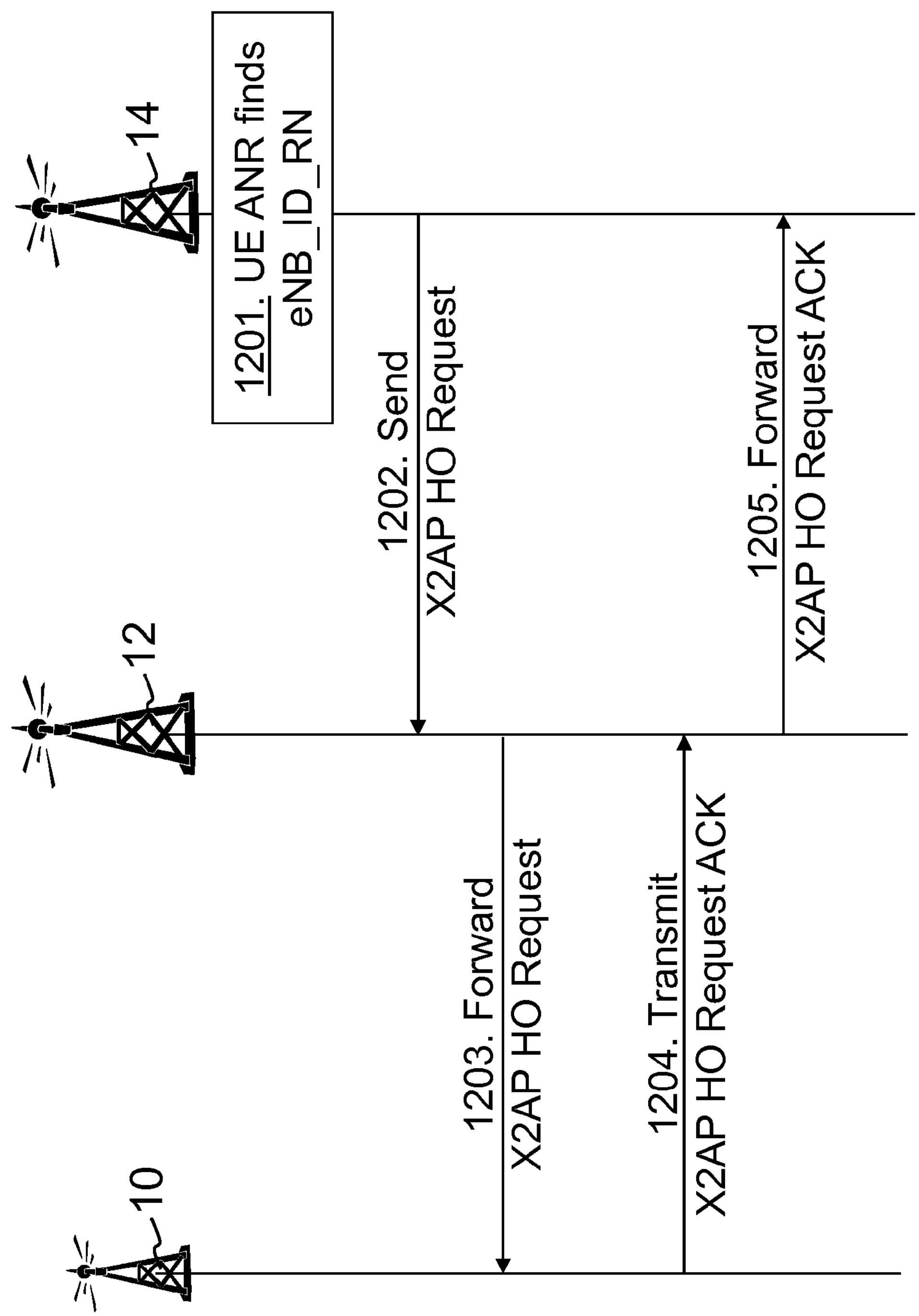
FIG. 12 is a schematic signalling scheme in a radio communications network.

FIG. 12 is a schematic overview of a method wherein the knowledge of X2 connectivity is acquired via incoming handover requests that originate from the second radio base station 14, as stated in case 2a, and are forwarded to the relay node 10 by the donor radio base station 12.

Step 1201. The neighbor radio base station, e.g. the second radio base station 14 may discover the relay node 10 via UE ANR. For example, another user equipment served by the second radio base station 14 reports signal strength measurement of the relay cell 11.

Step 1202. X2 is established between the second radio base station 14 and the donor radio base station 12 and in this case, the donor radio base station 12 has already informed the second radio base station 14 about the relay node 10 and its served cells either at startup of the relay node 10, via X2AP eNB configuration update message, or when X2 was established, via X2AP X2 setup request. Therefore, when the second radio base station 14 discovers the relay cell 11 served by the relay node 10, it may directly initiate handover preparations by sending X2AP handover request to the donor radio base station 12.

Step 1203. The X2AP handover request may comprise target cell ECGI, and from that the donor radio base station 12 may conclude that the discovered cell is served by the relay node 10 and forwards the X2AP handover request to the relay node 10. This is an example of the step 1705 in FIG. 17.

According to embodiments herein, the relay node 10 is made aware of the second radio base station 14 and also, based on the type of the Handover Request, the type of the radio network connection e.g. X2 availability. The relay node 10 additionally stores this information in relation to the second radio base station 14.

Step 1204. The relay node 10 may then transmit a X2AP Handover Request ACK to the donor radio base station 12.

Step 1205. The donor radio base station 12 then forwards the X2AP Handover Request ACK to the second radio base station 14.

This alternative may be handled by existing signaling and node behavior.

Figure 13:
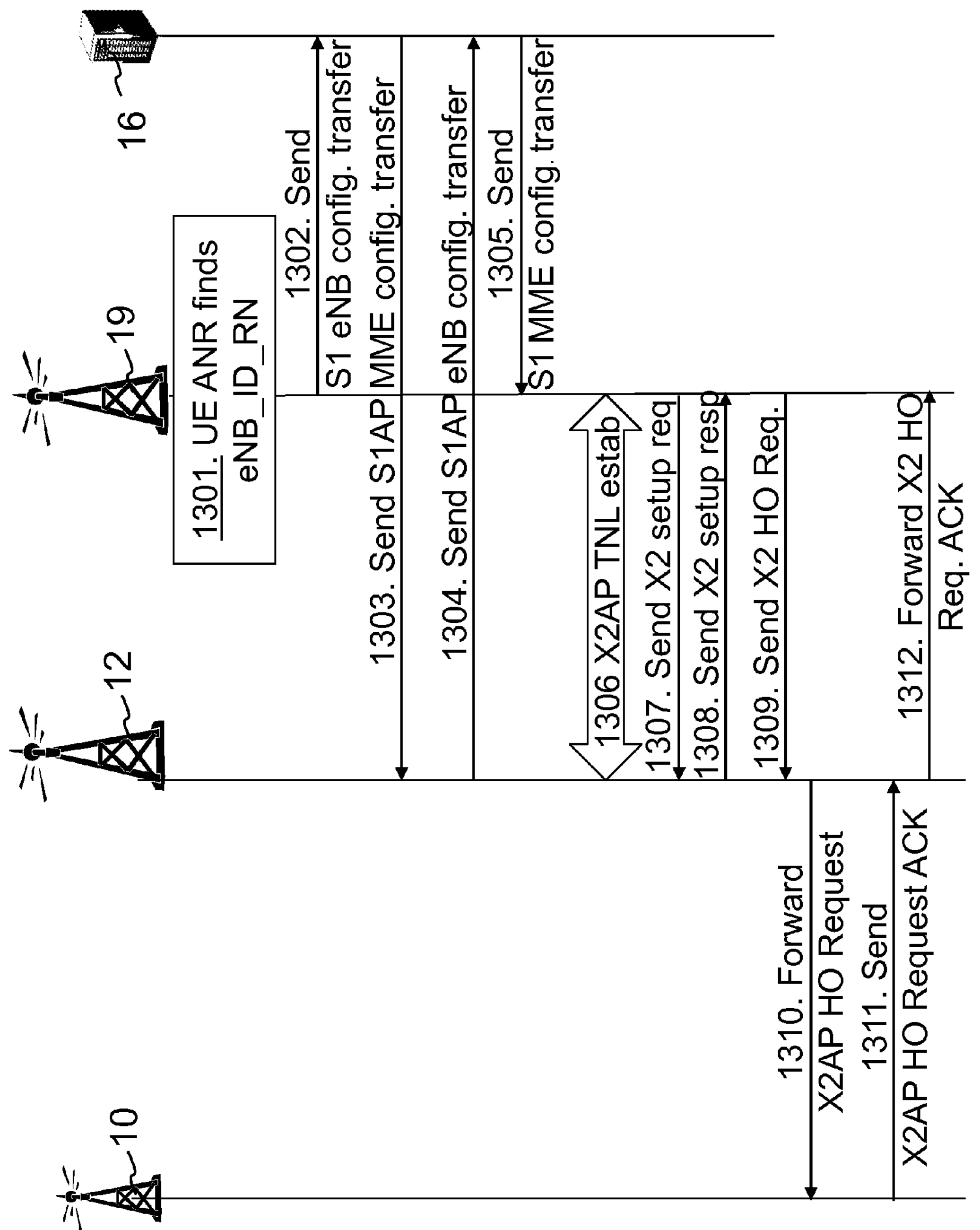
FIG. 13 is a schematic signalling scheme in a radio communications network.

FIG. 13 is a schematic overview of some embodiments where X2 is not established between a neighbor radio base station, e.g. the third radio base station 19, and the donor radio base station 12, as stated in case 2b. This case is essentially analogous to the case when X2 has been established, except for including the X2 establishment steps.

Step 1301. The neighbor radio base station, e.g. the third radio base station 19 discovers the relay node 10 via UE ANR. For example, another user equipment served by the third radio base station 19 reports signal strength measurement of the relay cell 11.

Step 1302. Since X2 is not established, the third radio base station 19 initiates TNL address recovery via S1 towards the donor radio base station 12 as the eNB ID of the relay node 10 is the same as eNB ID for donor radio base station 12. Thus, the third radio base station 19 sends an S1 eNB Configuration Transfer message to the first MME 16.

Step 1303. The first MME 16 sends an S1AP MME Configuration Transfer message to the donor radio base station 12.

Step 1304. The donor radio base station 12 sends an S1AP eNB Configuration Transfer message to the first MME 16.

Step 1305. The first MME 16 sends an S1 MME Configuration Transfer message to the third radio base station 19.

Step 1306. The donor radio base station 12 and the third radio base station 19 then initiates and performs a TNL establishment process.

Step 1307. Finally, when X2 TNL establishment, between the third radio base station 19 and the donor radio base station 12 is completed, served cell information is shared between the radio base stations 19,12 using X2AP, X2 Setup Request/Response. Thus, the third radio base station 19 sends an X2 setup request to the donor radio base station 12.

Step 1308. The donor radio base station 12 responds by sending an X2 setup response to the third radio base station 19.

Step 1309. Similar to the case when X2 was already established, the relay node is not informed about the X2 availability until third radio base station 19 initiates handover preparations via X2AP. The third radio base station 19 thus sends an X2 handover request to the donor radio base station 12.

Step 1310. The donor radio base station 12 then forwards the X2AP handover request to the relay node 10. This is an example of the step 1705 in FIG. 17.

The relay node 10 then discloses the radio network connection type based on the received message and stores the type in relation to the identity of the third radio base station 19.

Step 1311. The relay node 10 sends an X2AP handover request ACK to the donor radio base station 12.

Step 1312. The donor radio base station 12 then forwards the X2AP handover request ACK to the third radio base station 19.

If the X2 establishment is prohibited or fails, then S1 signaling is used instead. This alternative may thus also be handled by existing signaling and behavior. Thus, the relay node 10 may disclose X2 availability from an incoming X2 Handover Request forwarded by the donor radio base station.

Figure 14:
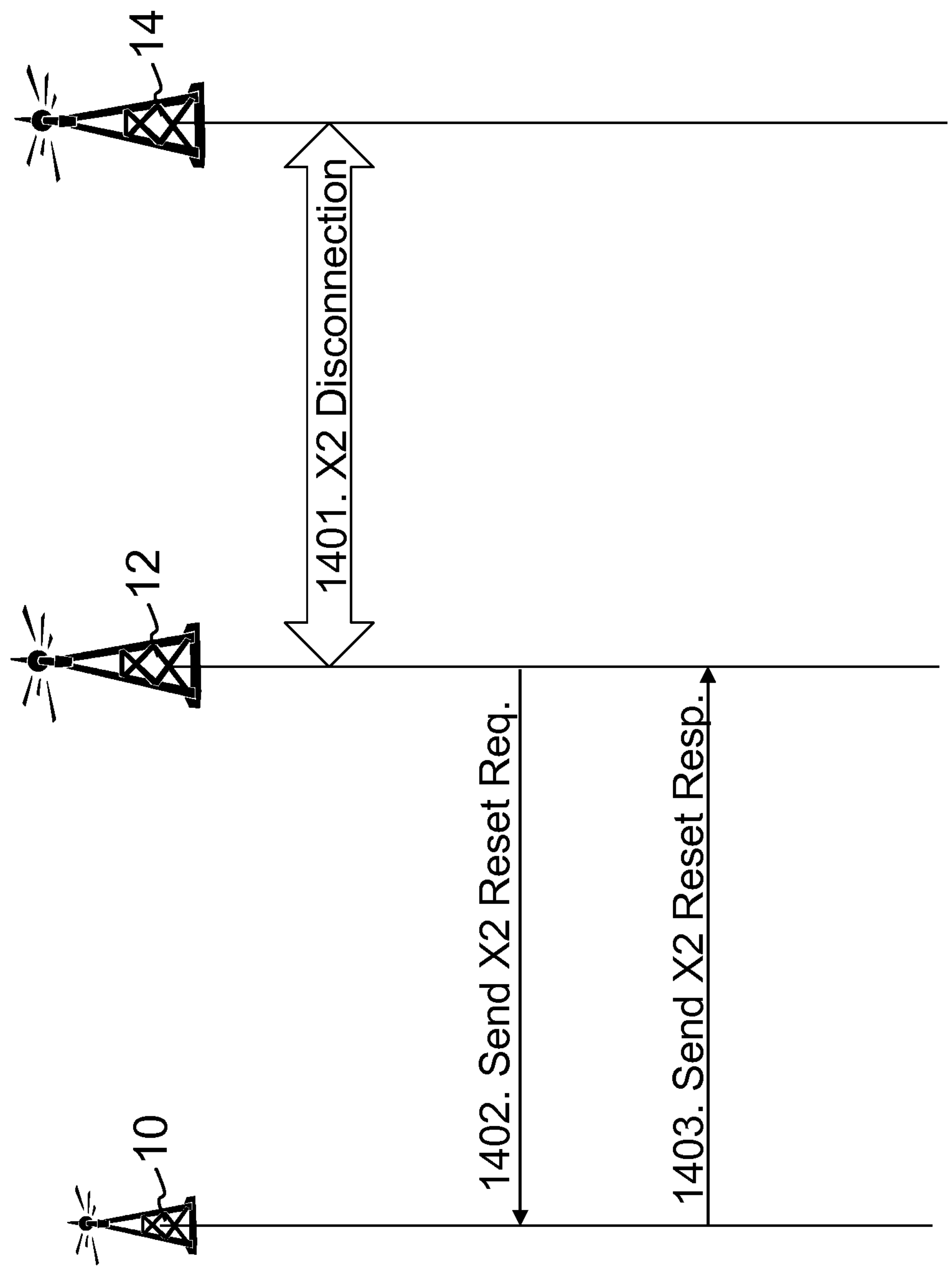
FIG. 14 is a schematic signalling scheme in a radio communications network.

FIG. 14 schematically shows an embodiment where X2 is disconnected between donor radio base station and a neighbouring eNB, such as the second radio base station 14, either controlled or due to failures.

Step 1401. The X2 connection between the donor radio base station 12 and the second radio base station 14 is disconnected.

Step 1402. The relay node 10 may need to be informed by the donor radio base station 12 about the disconnection. One example is for the donor radio base station 12 to compile a X2AP Reset message and send the X2AP reset request message to the relay node 10 on behalf of the second radio base station 14. This step is an example of step 1705 in FIG. 17.

Thus, the relay node 10 is informed about the type of the application protocol and consequently of the type of radio network connection. The relay node 10 stores that no X2 exists anymore to the second radio base station 14. This may be used by the relay node 10 to disclose X2 unavailability to a neighboring radio base station.

Step 1403. The relay node 10 may send an X2AP reset response to the second radio base station 14.

Figure 15:
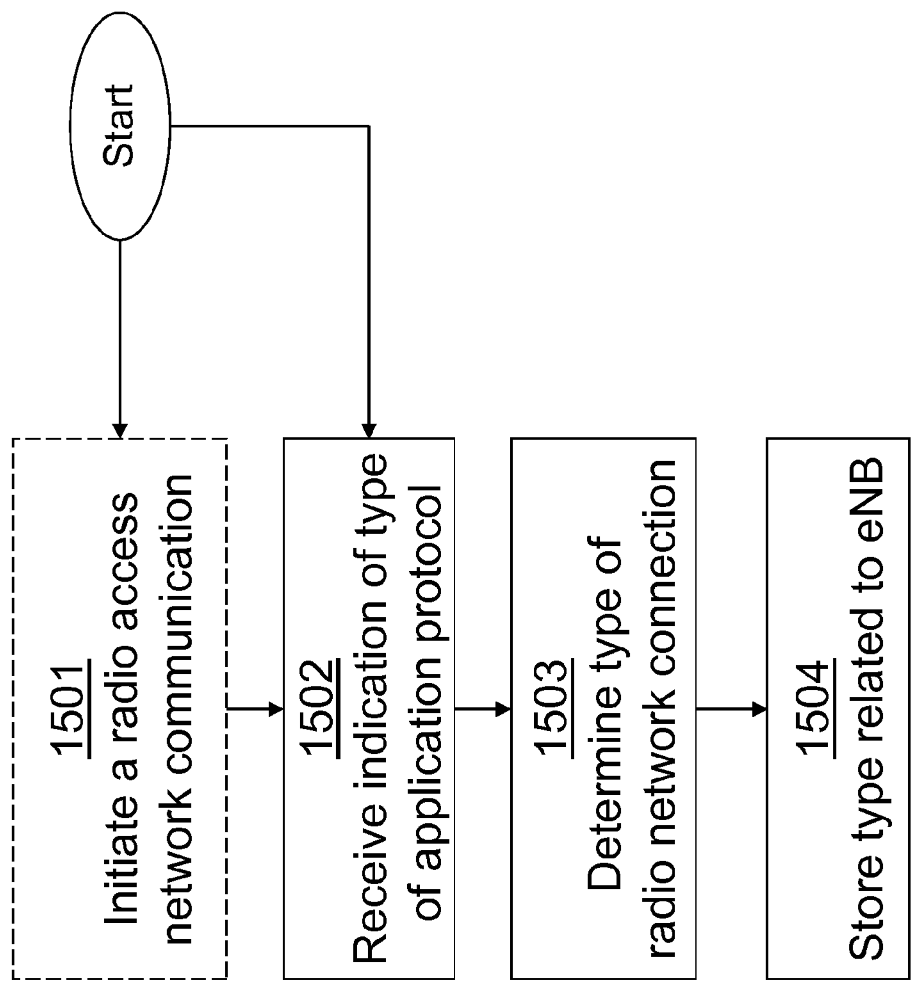
FIG. 15 is a schematic flow chart of a method in a relay node in a radio communications network.

The method steps in the relay node 10 for acquiring information about a type of a radio network connection between a donor radio base station 12 and a radio base station 14, referred to as the second radio base station 14 above, according to some general embodiments will now be described with reference to a flowchart depicted in FIG. 15. The steps do not have to be taken in the order stated below, but may be taken in any suitable order. The relay node 10 and the donor radio base station 12 are comprised in a radio communications network and the donor radio base station 12 is serving the relay node 10.

Step 1501. In some embodiments as indicated by the dashed line, the relay node 10 may initiate a radio access network communication to the radio base station 14 by transmitting a communication message of a first type of a radio network application protocol to the radio base station 14 over the donor radio base station 12. The received message, i.e. the response, is indicating the first type, e.g. X2AP, or a second type, e.g. S1AP, of a radio network application protocol.

In some embodiments, the communication message may comprise information, for address recovery of a detected cell served by the radio base station 14, such as a S1 Configuration ANR message. In some embodiments, a measurement report is received from a user equipment 18 in a cell of the radio communications network controlled by the relay node 10. The measurement report may indicate a cell identity of the detected cell of the radio base station 14. For example, the user equipment 18 may comprise an ANR functionality that detects the detected cell e.g. a cell identity detected in a broadcast channel.

In some embodiments, the communication message may comprise a handover request message of a first type of a radio network application protocol to a detected cell of the radio base station 14, e.g. an X2 or S1 HO request.

Step 1502. The relay node 10 receives a message from the donor radio base station 12. The message is indicating a type of radio network application protocol, e.g. the first type or the second type, which type is related to a type of the radio network connection between the donor radio base station 12 and the radio base station 14.

In some embodiments wherein the communication message may comprise information for address recovery, the received message may comprise a setup request of the first type or the second type of a radio network application protocol, e.g. X2 Setup or S1 setup.

In some embodiments wherein the HO request is sent, the received message comprises a handover confirmation indicating the first type or the second type of a radio network application protocol, e.g. X2 or S1 command or confirmed.

In some embodiment, the received message may comprise a handover request indicating the type of radio network application protocol, e.g. S1 or X2 HO request.

In some embodiments, the received message explicitly states the type of the radio network connection between the donor radio base station 12 and the radio base station 14,19. For example, the donor radio base station 12 may inform the relay node 10 about X2 support to the radio base station 14 in a new explicit message or a new Information Elements (IE) in an existing message.

In some embodiments, the received message may be represented by an application protocol message indicating a peer to peer connection in a radio access network of the radio communications network. The received message may alternatively be represented by an application protocol message indicating a connection terminated in a core network of the radio communications network.

Step 1503. The relay node 10 determines the type of the radio network connection based on the type of radio network application protocol indicated in the message.

In some embodiments, wherein the received message comprises a handover request, the relay node 10 determines the type of the radio network connection based on the type indicated in the handover request.

Step 1504. The relay node 10 stores the type of radio network connection in relation to the radio base station 14 for selecting the type of radio network connection when later communicating with the radio base station 14.

In some embodiments, the type of a radio network application protocol indicated in the received message is an X2 application protocol message or an S1 application protocol message, and the determined type of the radio network connection is an X2 application protocol connection or an S1 application protocol connection.

It should be understood that some embodiments herein disclose ways to acquire information whether the donor radio base station 12 has X2 connectivity to a neighbor radio base station. X2 support between the donor radio base station 12 and another radio base station may, in some embodiments, be disclosed by the relay node 10 without defining new dedicated signalling and new dedicated information elements. The donor radio base station 12 may compile X2 messages sent to the relay node 10 on behalf of a neighbouring radio base station means little modifications to the behaviour of the relay node 10 compared to the behaviour of an ordinary radio base station.

In some alternative embodiments the relay node 10 may acquire information about which radio base stations the donor radio base station 12 has X2 connectivity in the X2 setup procedure. In this procedure each radio base station should in the X2 SETUP REQUEST message or X2 SETUP RESPONSE message provide information about which cells are being served by each radio base station, Served Cell Information. In case of relay nodes and donor radio base stations it would be possible for the donor radio base station 12 to not only provide information about which cells is served by the donor radio base station 12 in this IE but also provide information about all cells being served by radio base stations that the donor radio base station 12 has X2 connectivity to. The relay node 10 could then use this information to determine which radio base stations and cells the relay node 10 can use the X2 procedure to.

In case more X2 connectivity neighbors are added or removed to the donor radio base station 12 at a later time the donor radio base station 12 may use the eNB configuration updated to the relay node 10 and add or remove the corresponding cells on the cells served indicated by a donor radio base station list.

In some embodiments above it is possible for the relay node 10 to initiate the X2 setup procedure or possible an eNB configuration update procedure in order to try to establish X2 connectivity for cells that the donor radio base station 12 is not X2 connected to. One possible trigger for this setup would be in the case the relay node 10 detects a new neighboring cell which the donor radio base station 12 currently does not have an X2 connection with. The X2 SETUP REQUEST may in this case be addressed to the second radio base station 14 serving the "new cell" but may still be intercepted by the donor radio base station 12 making it possible for the donor radio base station 12 to initiate X2 setup to the second radio base station 14 which it does not have an X2 connection to. Once the donor radio base station 12 have completed the X2 setup, the relay node 10 may be informed about the new X2 connection using any of the means outlined herein.

Another variant of the solution above is that the donor radio base station 12 based on learning that the relay node 10 is trying to contact another radio base station via X2 signaling, decides to try to establish an X2 connection to the second radio base station 14 in question. The X2 connection could be established fast enough to handle the X2 signaling from the relay node 10 directly or it may be established for future use.

Thus, X2 support between donor radio base station 12 and another radio base station, such as the second radio base station 14 may be disclosed by the relay node 10 without defining new dedicated signaling and new dedicated information elements. This facilitates the handover procedure.

As stated above, herein it is also disclosed a method in a relay node 10 initiating signaling between the relay node 10 and the second radio base station 14 via the donor radio base station 12 serving the relay node 10. The relay node 10 receives a response from the donor radio base station 12 based on the X2 establishment information in donor radio base station 12, disclosing whether X2 is established or not. The initiating signaling may include X2 signaling from the relay node 10 to the donor radio base station 12 or S1 signaling from the relay node 10 to the donor radio base station 12.

The received response from donor radio base station 12 to relay node 10 may be via X2, if X2 is established between donor radio base station 12 and the other radio base stations such as the second radio base station 14. The received response from the donor radio base station 12 to the relay node 10 may be via X2 if X2 is not established between donor radio base station 12 and the other radio base stations such as the second radio base station 14, and the X2 message may then include a reject or failure cause informing that X2 is not established between donor radio base station 12 and the other radio base stations such as the second radio base station 14.

The received response from the donor radio base station 12 to the relay node 10 may be via S1 if X2 is not established. The received response may then comprise explicit information in the cells served by eNB IE if X2 connectivity exists or not to a specific cell.

In the donor radio base station 12 an X2 message may be converted to the corresponding S1 message, which is sent to the second radio base station 14.

Figure 16:
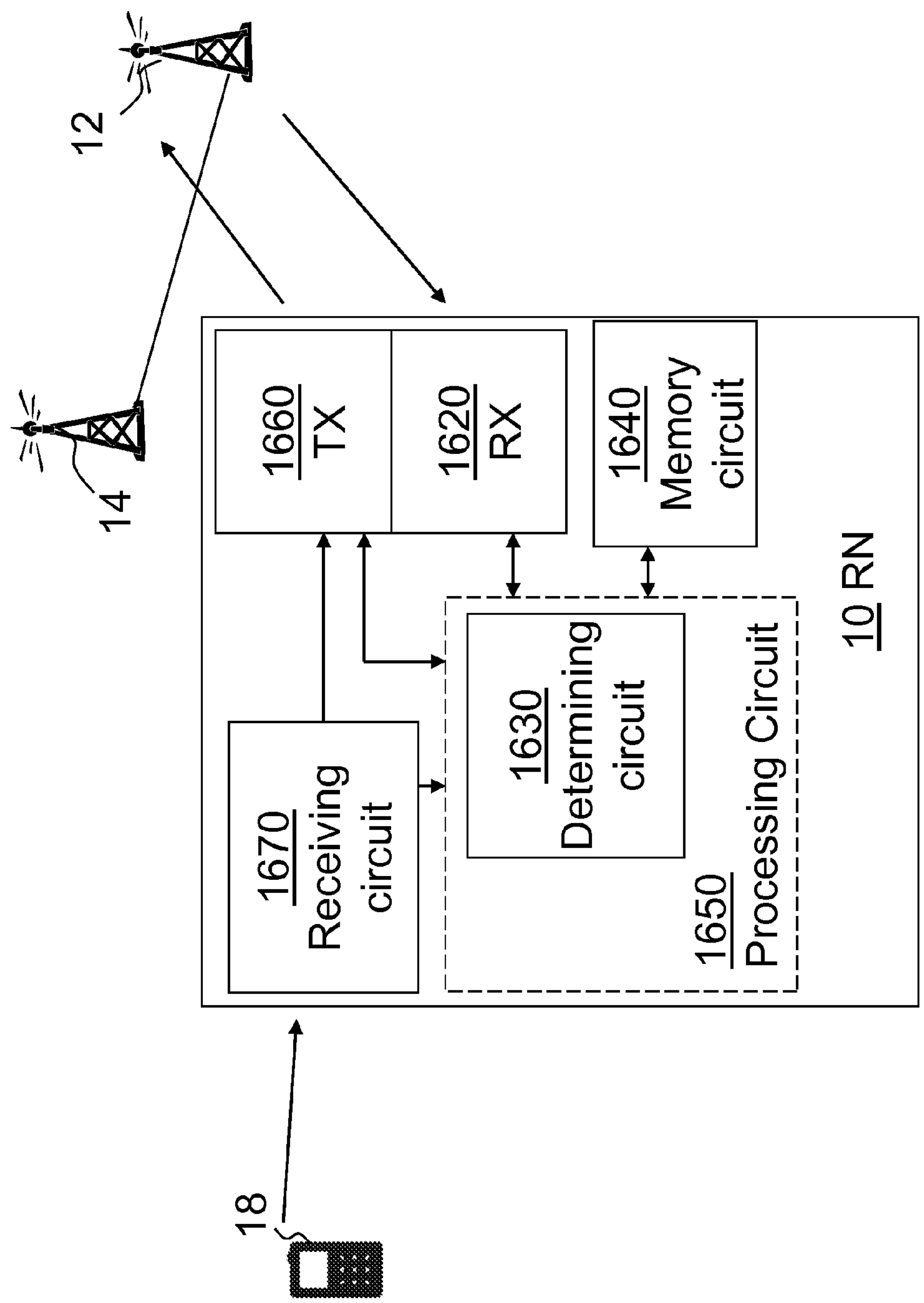
FIG. 16 is a block diagram of a relay node.

In order to perform the steps above a relay node 10 is provided. FIG. 16 is a block diagram depicting the relay node 10 for acquiring information about a type of a radio network connection between a donor radio base station 12 and a radio base station 14. The relay node 10 is arranged to be comprised in a radio communications network and is arranged to be served by the donor radio base station 12.

The relay node 10 comprises a receiver (RX) 1620 configured to receive a message from the donor radio base station 12, which message is indicating a type of radio network application protocol. The type of radio network application protocol is related to a type of the radio network connection between the donor radio base station 12 and the radio base station 14. The received message may comprise a handover request indicating the type of radio network application protocol. The received message may explicitly state the type of the radio network connection between the donor radio base station 12 and the radio base station 14,19. The received message may be represented by an application protocol message indicating a peer to peer connection in a radio access network of the radio communications network. The received message may alternatively be represented by an application protocol message indicating a connection terminated in a core network of the radio communications network.

The relay node further comprises a determining circuit 1630 configured to determine the type of the radio network connection based on the type of radio network application protocol indicated in the message. In some embodiments, wherein the received message comprises a handover request, the determining circuit may be configured to determine the type of the radio network connection based on the type indicated in the handover request.

Furthermore, the relay node 10 comprises a memory circuit 1640 configured to store the type of radio network connection in relation to the radio base station 14 to be used when selecting the type of radio network connection when later communicating with the radio base station 14. The memory circuit may further be used to store Cell IDs, connectivities, mobility parameters, and/or application to perform the methods herein when being executed on the relay node 10.

The embodiments herein for acquiring information about a type of a radio network connection between the donor radio base station 12 and the radio base station 14 may be implemented through one or more processors, such as a processing circuit 1650 in the relay node 10 depicted in FIG. 16, together with computer program code for performing the functions and/or method steps of the embodiments herein. The program code mentioned above may also be provided as a computer program product, for instance in the form of a data carrier carrying computer program code for performing the present solution when being loaded into the relay node 10. One such carrier may be in the form of a CD ROM disc. It is however feasible with other data carriers such as a memory stick. The computer program code may furthermore be provided as pure program code on a server and downloaded to the relay node 10.

The processing circuit 1650 may further be configured to initiate a radio access network communication to the radio base station 14 by transmitting, via a transmitter (TX) 1660, a communication message of a first type of a radio network application protocol to the radio base station 14 over the donor radio base station 12. The received message is indicating the first type or a second type of a radio network application protocol.

In some embodiments, the communication message may comprise information for address recovery of a detected cell served by the radio base station 14, and the received message may then comprise a setup request of the first type or the second type of a radio network application protocol.

In some embodiments, the communication message may comprise a handover request message of a first type of a radio network application protocol to a detected cell of the radio base station 14. The received message may then comprise a handover confirmation indicating the first type or the second type of a radio network application protocol, e.g. X2 or S1 command or confirmed.

In some embodiments, a measurement report is received over a receiving circuit 1670 from a user equipment 18 in a cell of the radio communications network controlled by the relay node 10. The measurement report may indicate a cell identity of the detected cell of the radio base station 14.

In some embodiments, the type of a radio network application protocol indicated in the received message is an X2 application protocol message or an S1 application protocol message, and the determined type of the radio network connection is an X2 application protocol connection or an S1 application protocol connection.

The method steps in the donor radio base station 12 for informing the relay node 10 about the type of the radio network connection between the donor radio base station 12 and the radio base station 14 according to some general embodiments will now be described with reference to a flowchart depicted in FIG. 17. The steps do not have to be taken in the order stated below, but may be taken in any suitable order. The relay node 10 and the donor radio base station 12 are comprised in the radio communications network, and the donor radio base station 12 serves the relay node 10.

Step 1701. The donor radio base station 12 receives a protocol message of a first type of a radio network application protocol, from the relay node (10), e.g. an X2AP HO request or a S1 eNB Configuration Transfer message; or from the radio base station (14), e.g. X2AP HO request or S1AP MME Configuration Transfer message.

Step 1702. In some embodiments as indicated by the dashed line, the donor radio base station 12 may determine whether a Peer to Peer (P2P) connection in a radio access network of the radio communications network is set up between the donor radio base station 12 and the radio base station 14.

Step 1703. In some embodiments as indicated by the dashed line, the donor radio base station 12, when such a peer to peer connection is setup, may perform a handover procedure over the peer to peer connection. The donor radio base station 12 may then transmit in the step below the handover confirmation to the relay node 10. The handover confirmation indicates a type of a peer to peer application protocol.

Step 1704. In some embodiments as indicated by the dashed line, the donor radio base station 12, when no such a peer to peer connection is setup, may initiate a handover procedure over a connection terminated in a core network of the radio communications network. The donor radio base station may then transmit in the step below a handover command as the handover confirmation. The handover confirmation indicates a type of an application protocol of a connection terminated in the core network.

Alternatively, when no such a peer to peer connection exists, the donor radio base station 12 may initiate a setup of a peer to peer connection to the radio base station 14 via a connection terminated in a core network of the radio communications network to a mobility management entity 16. The donor radio base station 12 may then transmit a setup message to the relay node 10 in the step below. The setup message is indicating the first type or the second type to be a peer to peer connection.

Step 1705. The donor radio base station 12 transmits a message to the relay node 10. The message is indicating the first type or a second type of a radio network application protocol. Each type of a radio network application protocol is related to a type of a radio network connection and thereby the relay node 10 is informed of the type of the radio network connection.

In some embodiments, when a peer to peer connection exists, the donor radio base station 12 may transmit a setup message to the relay node 10. The setup message is indicating the first type or the second type to be a peer to peer connection. That is, if the received first type of radio network application protocol is of an application protocol of a connection terminated in a core network, the setup message indicating the second type to be an application protocol of a peer to peer connection.

In some embodiments, the donor radio base station 12 may compile the setup message to be on behalf of the radio base station 14.

In some embodiments, the received protocol message may comprise a handover request of a user equipment 18 to a cell of the radio base station 14 or to a cell of the relay station 10. The transmitted message may then comprise a handover confirmation or a handover request, forwarded.

The handover request may represented by a handover message of the first type. The first type may indicate a peer to peer connection in a radio access network of the radio communications network, or may indicate a connection terminated in a core network of the radio communications network.

In some embodiments, the received protocol message may comprise information for address retrieval of a detected cell of the radio base station 14, which received protocol message is sent from the relay node 10. Then, the transmitted message may comprise a connection setup request to the relay node 10 of the first type.

In some embodiments, the first type of a radio network application protocol may be an X2 application protocol or an S1 application protocol and the second type of a radio communications network may be an S1 application protocol or an X2 application protocol.

Figure 18:
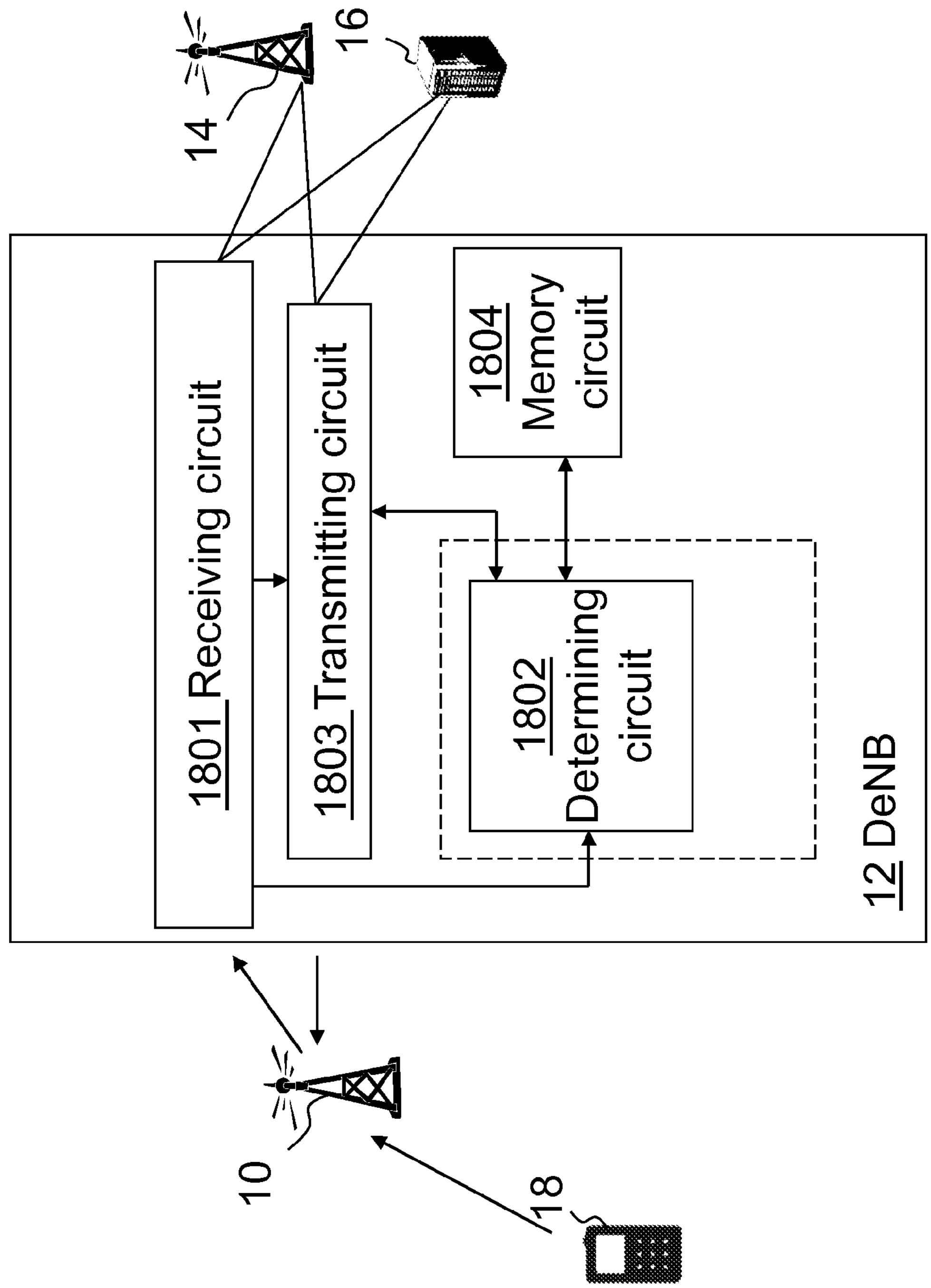
FIG. 18 is a block diagram of a donor radio base station.

In order to perform the method steps in the donor radio base station 12 for informing the relay node 10 about the type of the radio network connection between the donor radio base station 12 and the radio base station 14, a donor radio base station is provided. FIG. 18 is a block diagram depicting the donor radio base station 12. The donor radio base station 12 serves the relay node 10.

The donor radio base station 12 comprises a receiving circuit 1801 configured to receive a protocol message of a first type of a radio network application protocol, from the relay node 10 or from the radio base station 14.

In some embodiments, the donor radio base station 12 may comprise a determining circuit 1802 configured to determine whether a peer to peer connection in a radio access network of the radio communications network is set up between the donor radio base station 12 and the radio base station 14. The determining circuit 1802 may, when such a peer to peer connection is setup, further be configured to perform a handover procedure over the peer to peer connection.

The donor radio base station 12 further comprises a transmitting circuit 1803 configured to transmit a message to the relay node 10. The message is indicating the first type or a second type of a radio network application protocol, and wherein each type of a radio network application protocol is related to a type of the radio network connection. Thereby, the relay node 10 is informed of the type of the radio network connection.

The transmitting circuit 1803 may be configured to transmit the handover confirmation to the relay node 10. The handover confirmation indicates a type of a peer to peer application protocol.

The determining circuit 1802 may, when no such a peer to peer connection is setup, initiate a handover procedure over a connection terminated in a core network of the radio communications network. The transmitting circuit 1803 may then transmit a handover command as the handover confirmation. The handover confirmation indicates a type of an application protocol of a connection terminated in the core network.

Alternatively, when no such a peer to peer connection exists, the determining circuit 1802 may initiate a setup of a peer to peer connection to the radio base station 14 via a connection terminated in a core network of the radio communications network to a mobility management entity 16. The transmitting circuit 1803 may then transmit a setup message to the relay node 10. The setup message is indicating the first type or the second type to be a peer to peer connection.

Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a relay node for acquiring information about a type of a radio network connection between a donor radio base station serving the relay node and another radio base station, which relay node and donor radio base station are included in a radio communications network, the method comprising:

receiving a message from the donor radio base station, which message indicates a type of radio network application protocol, and which type of radio network application protocol is related to a type of a radio network connection between the donor radio base station and the another radio base station; and determining the type of the radio network connection between the donor radio base station and the another radio base station based on the type of radio network application protocol indicated in the message.

2. The method according to claim 1, further comprising initiating a radio access network communication to the another radio base station by transmitting a communication message of a first type of a radio network application protocol to the another radio base station over the donor radio base station, and wherein the received message indicates the first type or a second type of a radio network application protocol.

3. The method according to claim 2, wherein the communication message comprises information for address recovery of a detected cell served by the radio base station and wherein the received message comprises a setup request of the first type or the second type of a radio network application protocol.

4. The method according to claim 3, wherein a measurement report is received from a user equipment in a cell of the radio communications network controlled by the relay node, which measurement report indicates a cell identity of the detected cell of the another radio base station.

5. The method according to claim 2, wherein the communication message comprises a handover request message of a first type of a radio network application protocol to a detected cell of the another radio base station and the received message comprises a handover confirmation indicating the first type or the second type of a radio network application protocol.

6. The method according to claim 1, wherein the received message comprises a handover request indicating the type of radio network application protocol, and wherein the determining of the type of the radio network connection is based on the type indicated in the handover request.

7. The method according to claim 1, wherein the received message explicitly states the type of the radio network connection between the donor radio base station and the another radio base station.

8. The method according to claim 1, wherein the received message is represented by an application protocol message indicating a peer to peer connection in a radio access network of the radio communications network, or wherein the received message is represented by an application protocol message indicating a connection terminated in a core network of the radio communications network.

9. The method according to claim 1, wherein the type of a radio network application protocol indicated in the received message is an X2 application protocol message or an S1 application protocol message and the determined type of the radio network connection is an X2 application protocol connection or an S1 application protocol connection.

10. The method of claim 1, further comprising storing the type of radio network connection in relation to the another radio base station for selecting the type of radio network connection when later communicating with the another radio base station.

11. The method of claim 1 wherein the message from the donor radio base station indicates a failure of a radio network connection between the donor radio base station and the another radio base station of a first type of radio network application protocol.

12. The method of claim 11 wherein the first type of radio network application protocol is an X2 interface.

13. The method of claim 11 further comprising, prior to the receiving:

initiating a radio access network communication to the another radio base station by transmitting a communication message of the first type of a radio network application protocol to the another radio base station over the donor radio base station, wherein the first type of radio network application protocol is an X2 interface.

14. The method of claim 11 further comprising, in response to the receiving the message and subsequent to the receiving and the determining:

initiating a second radio access network communication to the another radio base station by transmitting a communication message of a second type of a radio network application protocol to the another radio base station over the donor radio base station, wherein the second type of radio network application protocol is an S1 interface.

15. A relay node for acquiring information about a type of a radio network connection between a donor radio base station serving the relay node and another radio base station, which relay node is arranged to be comprised in a radio communications network, the relay node comprising:

a receiver configured to receive a message from the donor radio base station, which message indicates a type of radio network application protocol, which type of radio network application protocol is related to a type of a radio network connection between the donor radio base station and the another radio base station; and a determining circuit configured to determine the type of the radio network connection between the donor radio base station and the another radio base station based on the type of radio network application protocol indicated in the message.

16. The relay node of claim 15, further comprising a memory circuit configured to store the type of radio network connection in relation to another the radio base station to be used when selecting the type of radio network connection when later communicating with the another radio base station.

* * * * *